US012335877B2

(12) United States Patent
Ozdural et al.

(10) Patent No.: US 12,335,877 B2
(45) Date of Patent: Jun. 17, 2025

(54) TECHNIQUES FOR DETERMINING UPLINK POWER FOR MULTIPLE CONCURRENT UPLINK TRANSMISSIONS

(71) Applicant: QUALCOMM Incorporated, San Diego, CA (US)

(72) Inventors: John Can Ozdural, San Diego, CA (US); Sachin Jain, Santa Clara, CA (US); Kondalreddy Narlengi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 17/470,232

(22) Filed: Sep. 9, 2021

(65) Prior Publication Data

US 2022/0078720 A1    Mar. 10, 2022

Related U.S. Application Data

(60) Provisional application No. 63/076,779, filed on Sep. 10, 2020.

(51) Int. Cl.
*H04W 52/14* (2009.01)
*H04W 52/18* (2009.01)

(52) U.S. Cl.
CPC ......... *H04W 52/146* (2013.01); *H04W 52/18* (2013.01)

(58) Field of Classification Search
CPC ......... H04W 52/00–60; H04W 52/146; H04W 52/18
See application file for complete search history.

(56) References Cited

U.S. PATENT DOCUMENTS

| 2012/0083309 A1* | 4/2012 | Kwon | H04B 17/24 455/522 |
| 2012/0176950 A1* | 7/2012 | Zhang | H04L 5/001 370/311 |

(Continued)

FOREIGN PATENT DOCUMENTS

| EP | 3592080 A1 | 1/2020 |
| WO | WO-2012060625 A2 | 5/2012 |
| WO | WO-2016186395 A1 | 11/2016 |

OTHER PUBLICATIONS

International Search Report and Written Opinion—PCT/US2021/049786—ISA/EPO—Dec. 8, 2021.

*Primary Examiner* — Raymond S Dean
(74) *Attorney, Agent, or Firm* — Dalei Dong; Holland & Hart LLP

(57) ABSTRACT

Methods, systems, and devices for wireless communications are described for uplink transmit power determination in which a user equipment (UE) may be configured for carrier aggregation of multiple concurrent uplink component carrier (CC) transmissions. The UE may apply an adjustment to a maximum transmit power limit (MTPL) for one or more CCs when the UE is configured for uplink carrier aggregation. The MTPL adjustment may be applied to reduce a transmit power of one of the CCs when a maximum transmit power is requested for the CC. The MTPL adjustment may reduce the transmit power to be less than the MTPL of the UE and thereby provide that one or more other CCs may still have some transmission power. The UE may compute a MTPL adjustment based on a static value or on a per-subframe basis based on scheduling parameters and a requested transmit power for each CC.

30 Claims, 13 Drawing Sheets

(56) References Cited

U.S. PATENT DOCUMENTS

| | | | |
|---|---|---|---|
| 2015/0230206 A1 | 8/2015 | Tabet et al. | |
| 2015/0351039 A1* | 12/2015 | Yang | H04W 4/08 |
| | | | 370/328 |
| 2017/0118737 A1* | 4/2017 | Batchu | H04W 36/0022 |
| 2017/0142668 A1* | 5/2017 | Takeda | H04W 52/367 |
| 2017/0325175 A1 | 11/2017 | Dinan et al. | |
| 2019/0059129 A1* | 2/2019 | Luo | H04W 52/0216 |
| 2019/0173626 A1* | 6/2019 | Wang | H04L 25/067 |
| 2020/0314800 A1* | 10/2020 | Xu | H04L 12/1868 |

\* cited by examiner

TECHNIQUES FOR DETERMINING UPLINK POWER FOR MULTIPLE CONCURRENT UPLINK TRANSMISSIONS

CROSS REFERENCE

The present Application for Patent claims the benefit of U.S. Provisional Patent Application No. 63/076,779 by OZDURAL et al., entitled "TECHNIQUES FOR DETERMINING UPLINK POWER FOR MULTIPLE CONCURRENT UPLINK TRANSMISSIONS," filed Sep. 10, 2020, assigned to the assignee hereof, and expressly incorporated by reference herein.

FIELD OF TECHNOLOGY

The following relates to wireless communications, including techniques for determining uplink power for multiple concurrent uplink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may transmit communications, such as to a base station or other device, using a transmit power that may be based on power control procedures that may increase or decrease an amount of transmit power in accordance with channel conditions between the UE and base station. In some cases, a UE may be limited to a maximum transmission power (e.g., due to regulatory limitations or hardware limitations at the UE) that limits a total transmit power of the UE across one or multiple carriers. Efficient techniques to set transmit power in cases where multiple carriers are present may be desirable.

SUMMARY

The described techniques relate to improved methods, systems, devices, and apparatuses that support techniques for determining uplink power for multiple concurrent uplink transmissions. In various aspects, techniques provide for uplink power determination based on whether a user equipment (UE) is configured for carrier aggregation in which multiple uplink carriers may be concurrently transmitted by the UE. In some cases, the UE may apply an adjustment to a maximum transmission power limit (MTPL) parameter to one or more component carriers (CCs) when the UE is configured for uplink carrier aggregation. The MTPL adjustment may be applied to reduce a transmit power of one of the CCs when a maximum transmit power is requested for the CC. The MTPL adjustment may reduce the transmit power to be less than the MTPL of the UE and thereby provide that one or more other CCs may still have some transmission power. In some cases, the UE may compute a MTPL adjustment on a per-subframe basis based on scheduling parameters and a requested transmit power for each CC. In some cases, a CC may be in a discontinuous transmission (DTX) state in which no transmissions are made on the CC for a particular subframe, and the UE may adjust the MTPL value for one or more other carriers to allow for a higher transmission power in the particular subframe.

A method of wireless communication at a UE is described. The method may include receiving scheduling information from a base station for a set of subframes, determining, based on the scheduling information, one or more scheduling parameters for each of a set of component carriers used for uplink communications with the base station, calculating, for each subframe of the set of subframes based on the one or more scheduling parameters, a power adjustment to a maximum transmit power limit for the each of the set of component carriers, where a first power adjustment for a first component carrier of the set of component carriers is determined based on a second scheduling parameter of a second component carrier, and a second power adjustment for the second component carrier of the set of component carriers is based on a first scheduling parameter of the first component carrier, and transmitting uplink communications to the base station in each subframe using one or more of the set of component carriers with a transmit power for each component carrier that is based on the calculating.

An apparatus for wireless communication at a UE is described. The apparatus may include a processor, memory coupled with the processor, and instructions stored in the memory. The instructions may be executable by the processor to cause the apparatus to receive scheduling information from a base station for a set of subframes, determine, based on the scheduling information, one or more scheduling parameters for each of a set of component carriers used for uplink communications with the base station, calculate, for each subframe of the set of subframes based on the one or more scheduling parameters, a power adjustment to a maximum transmit power limit for the each of the set of component carriers, where a first power adjustment for a first component carrier of the set of component carriers is determined based on a second scheduling parameter of a second component carrier, and a second power adjustment for the second component carrier of the set of component carriers is based on a first scheduling parameter of the first component carrier, and transmit uplink communications to the base station in each subframe using one or more of the set of component carriers with a transmit power for each component carrier that is based on the calculating.

Another apparatus for wireless communication at a UE is described. The apparatus may include means for receiving scheduling information from a base station for a set of subframes, determining, based on the scheduling information, one or more scheduling parameters for each of a set of component carriers used for uplink communications with the base station, calculating, for each subframe of the set of subframes based on the one or more scheduling parameters, a power adjustment to a maximum transmit power limit for the each of the set of component carriers, where a first power adjustment for a first component carrier of the set of component carriers is determined based on a second scheduling parameter of a second component carrier, and a second power adjustment for the second component carrier of the set of component carriers is based on a first scheduling parameter of the first component carrier, and transmitting uplink communications to the base station in each subframe using one or more of the set of component carriers with a transmit power for each component carrier that is based on the calculating.

A non-transitory computer-readable medium storing code for wireless communication at a UE is described. The code may include instructions executable by a processor to receive scheduling information from a base station for a set of subframes, determine, based on the scheduling information, one or more scheduling parameters for each of a set of component carriers used for uplink communications with the base station, calculate, for each subframe of the set of subframes based on the one or more scheduling parameters, a power adjustment to a maximum transmit power limit for the each of the set of component carriers, where a first power adjustment for a first component carrier of the set of component carriers is determined based on a second scheduling parameter of a second component carrier, and a second power adjustment for the second component carrier of the set of component carriers is based on a first scheduling parameter of the first component carrier, and transmit uplink communications to the base station in each subframe using one or more of the set of component carriers with a transmit power for each component carrier that is based on the calculating.

In some examples of the method, apparatuses, and non-transitory computer-readable medium described herein, the power adjustment may be based on scheduling information for the set of subframes indicating whether data is to be transferred using each component carrier of the set of component carriers for each subframe. In some examples of the method, apparatuses, and non-transitory computer-readable medium described herein, the power adjustment may be further based on a maximum allowed value of the power adjustment.

Some examples of the method, apparatuses, and non-transitory computer-readable medium described herein may further include operations, features, means, or instructions for determining that a maximum available UE transmit power is requested for the first component carrier for a first subframe, and where the power adjustment provides power for the second component carrier and maintains a combined transmit power of the UE at or below a combined maximum transmit power limit of the UE.

In some examples of the method, apparatuses, and non-transitory computer-readable medium described herein, the calculating further may include operations, features, means, or instructions for determining, based on a discontinuous reception configuration of the second component carrier, that the second component carrier is unscheduled for uplink communications in a first subframe, setting the second transmit power to zero for the first subframe based on the discontinuous reception configuration, and determining the power adjustment to the maximum transmit power limit for the first component carrier for the first subframe based on the setting the second transmit power to zero for the first subframe. In some examples of the method, apparatuses, and non-transitory computer-readable medium described herein, the first component carrier may be a primary component carrier configured by the base station, and the second component carrier may be a secondary component carrier configured by the base station. In some examples of the method, apparatuses, and non-transitory computer-readable medium described herein, the first component carrier may be configured for a first RAT, and the second component carrier may be configured for a second RAT. In some examples, the first RAT and the second RAT may be accessed using different subscriber identity modules (SIMs) of the UE. In some examples of the method, apparatuses, and non-transitory computer-readable medium described herein, the power adjustment may be based on a power class of the UE.

A method of wireless communication at a UE is described. The method may include determining whether the UE is configured for uplink communications using uplink carrier aggregation of a set of uplink component carriers, adjusting a maximum uplink transmit power of each component carrier of the set of uplink component carriers based on determining that the UE is configured for uplink communications using uplink carrier aggregation, and transmitting uplink communications to a base station using at least a first component carrier of the set of component carriers using an uplink transmit power that is at or below the adjusted maximum uplink transmit power of the first component carrier.

An apparatus for wireless communication at a UE is described. The apparatus may include a processor, memory coupled with the processor, and instructions stored in the memory. The instructions may be executable by the processor to cause the apparatus to determine whether the UE is configured for uplink communications using uplink carrier aggregation of a set of uplink component carriers, adjust a maximum uplink transmit power of each component carrier of the set of uplink component carriers based on determining that the UE is configured for uplink communications using uplink carrier aggregation, and transmit uplink communications to a base station using at least a first component carrier of the set of component carriers using an uplink transmit power that is at or below the adjusted maximum uplink transmit power of the first component carrier.

Another apparatus for wireless communication at a UE is described. The apparatus may include means for determining whether the UE is configured for uplink communications using uplink carrier aggregation of a set of uplink component carriers, adjusting a maximum uplink transmit power of each component carrier of the set of uplink component carriers based on determining that the UE is configured for uplink communications using uplink carrier aggregation, and transmitting uplink communications to a base station using at least a first component carrier of the set of component carriers using an uplink transmit power that is at or below the adjusted maximum uplink transmit power of the first component carrier.

A non-transitory computer-readable medium storing code for wireless communication at a UE is described. The code may include instructions executable by a processor to determine whether the UE is configured for uplink communications using uplink carrier aggregation of a set of uplink component carriers, adjust a maximum uplink transmit power of each component carrier of the set of uplink component carriers based on determining that the UE is configured for uplink communications using uplink carrier aggregation, and transmit uplink communications to a base station using at least a first component carrier of the set of component carriers using an uplink transmit power that is at or below the adjusted maximum uplink transmit power of the first component carrier.

In some examples of the method, apparatuses, and non-transitory computer-readable medium described herein, the adjusting the maximum uplink transmit power may include operations, features, means, or instructions for reducing a maximum transmit power limit of each of the two or more uplink component carriers by a maximum transmit power adjustment value of the UE. In some examples of the method, apparatuses, and non-transitory computer-readable medium described herein, the maximum transmit power limit and the maximum transmit power adjustment value may be hardware-based parameters of the UE.

In some examples of the method, apparatuses, and non-transitory computer-readable medium described herein, the adjusting the maximum uplink transmit power of the first component carrier allows the UE to allocate transmit power to a second component carrier when the base station requests a maximum available transmit power for an uplink transmission of the first component carrier, and where a combined transmit power of the first component carrier and the second component carrier remains at or below a combined maximum transmit power limit of the UE. Some examples of the method, apparatuses, and non-transitory computer-readable medium described herein may further include operations, features, means, or instructions for determining that the UE is reconfigured to remove the uplink carrier aggregation configuration and that uplink communications are to use a single component carrier, and discontinuing adjustment of the maximum uplink transmit power.

In some examples of the method, apparatuses, and non-transitory computer-readable medium described herein, the adjusting a maximum uplink transmit power of each of the set of uplink component carriers may include operations, features, means, or instructions for applying a static hardware-based power adjustment to a maximum transmit power limit of each component carriers of the set of uplink component carriers. In some examples of the method, apparatuses, and non-transitory computer-readable medium described herein, the first component carrier may be a primary component carrier configured by the base station, and a second component carrier of the set of component carriers may be a secondary component carrier configured by the base station. In some examples of the method, apparatuses, and non-transitory computer-readable medium described herein, the first component carrier may be configured for a first RAT, and a second component carrier of the set of component carriers may be configured for a second RAT. In some examples of the method, apparatuses, and non-transitory computer-readable medium described herein, the adjusting the maximum uplink transmit power may be further based on a power class of the UE.

DETAILED DESCRIPTION

Figure 1:
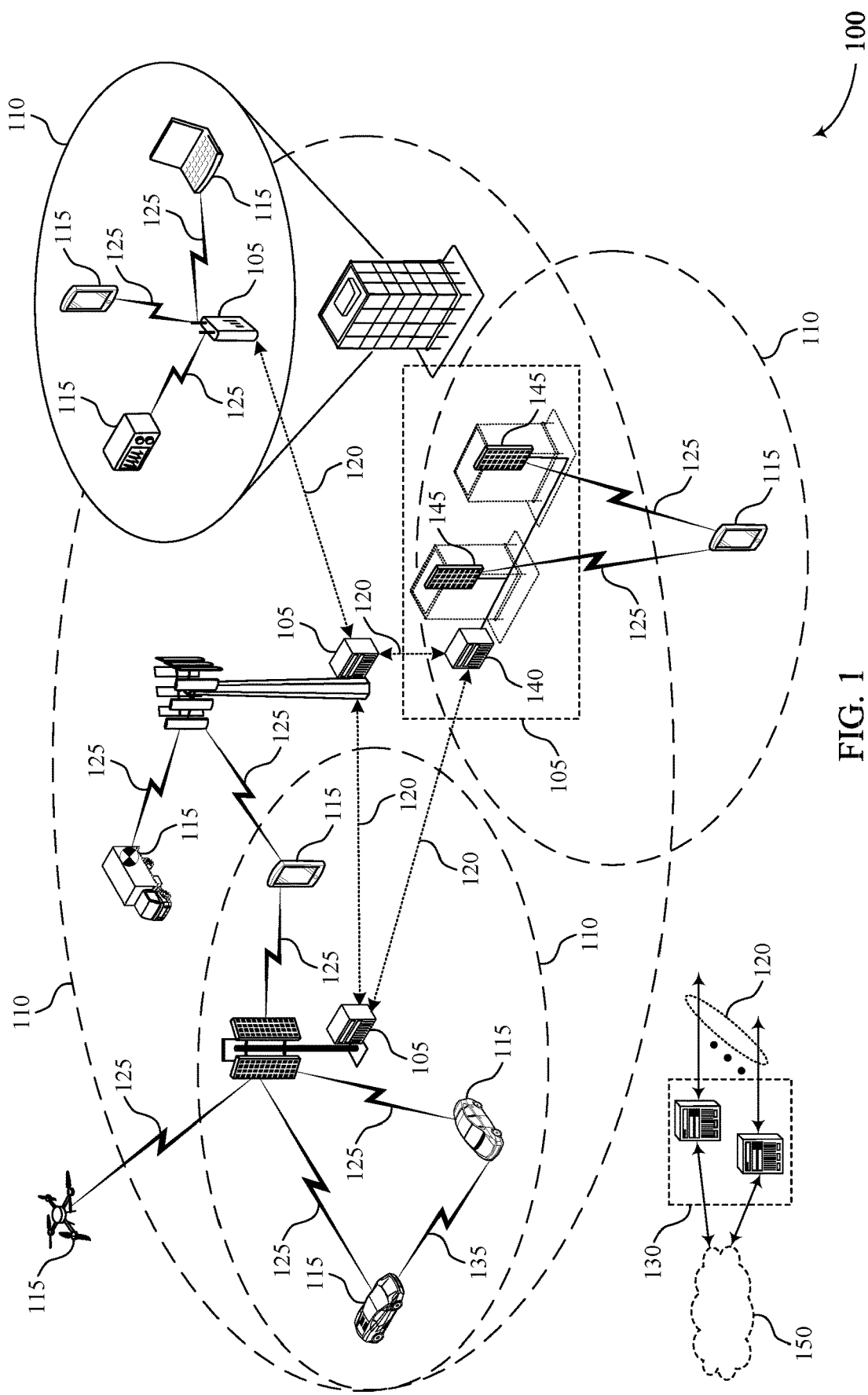
FIG. 1 illustrates an example of a system for wireless communications that supports techniques for determining uplink power for multiple concurrent uplink transmissions in accordance with aspects of the present disclosure.

Some wireless communications systems may have limitations on a power at which a device may transmit. For example, a user equipment (UE) that operates in a wireless communications system (e.g., a UE in a 4G or a 5G wireless communications system) may have a maximum transmission power limit (MTPL), and the UE may be constrained to transmit at a power that does not exceed the MTPL. For example, UEs may have a MTPL of 23 dBm+/−2 dBm, giving an upper bound of the MTPL of 25 dBm. Such a MTPL may apply to a total transmission power of the UE, which may be a combined transmit power of two or more component carriers (CCs) when the UE is configured for uplink carrier aggregation.

In some cases, a base station or other network device may request that the UE increase or decrease transmit power for one or more CCs based on one or more prior transmissions of the UE. For example, a base station may transmit a transmission power control (TPC) command to the UE to request increased transmission power in the event that the base station detects a signal to interference and noise ratio (SINR) that is below a target value, and to request decreased transmission power in the event that the SINR is above the target value. In cases where the SINR is persistently below the target SINR, the TPC commands may result in the base station requesting a maximum transmit power from the UE for the CC. In uplink carrier aggregation cases, each CC may have its own MTPL value, and thus a MTPL per carrier (e.g., 25 dBm/CC). Further, a combined MTPL is the limit on the overall power UE can transmit in uplink carrier aggregation cases (e.g., 25 dBm). Thus, in cases where the maximum transmit power (e.g., 25 dBm) for each CC of a plurality of CCs is requested, the UE may be unable to transmit each CC at the requested maximum power because such transmissions may result in a combined transmission power that exceeds the combined MTPL of the UE. In such cases, the UE may give priority to a CC that contains uplink control information (UCI), such as a primary CC (PCC), and in the event that the requested transmit power of the PCC corresponds to the MTPL, the UE may be unable to transmit using any other CCs of the plurality of CCs while still complying with the MTPL of the UE, which may result in throughput degradation.

In various aspects discussed herein, techniques provide for uplink power determination based on whether a UE is configured for carrier aggregation in which multiple uplink CCs may be concurrently transmitted by the UE. In some cases, the UE may apply an adjustment to the MTPL parameter for one or more CCs when the UE is configured for uplink carrier aggregation. The MTPL adjustment may be a hardware-based parameter associated with the UE, and may be applied to reduce a transmit power of one or more of the CCs and thereby provide power distribution across the multiple CCs even in the event that a maximum power is requested for one or more of the CCs (e.g., a PCC). Such techniques thus prevent the one or more other CCs (e.g., a secondary CC (SCC)) from having to have a zero transmission power. In some cases, the UE may compute a MTPL adjustment on a per-subframe basis based on scheduling parameters and a requested transmit power for each subcarrier. In some cases, a CC may be in a discontinuous transmission (DTX) state in which no transmissions are made on the CC for a particular subframe, and the UE may adjust the MTPL value for one or more other carriers to allow for a higher transmission power in the particular subframe.

In some cases, the UE may reduce the MTPL per CC by a MTPL adjustment value on a CC that carries UCI (e.g., a PCC), which may be referred to as a first CC in some examples. Such an MTPL adjustment to the first CC may allow some headroom to a second CC (e.g., a SCC), while still providing an aggregate transmission power of the UE that complies with the combined MTPL of the UE. In some cases, such a MTPL adjustment is a static adjustment value that is applied to the first CC whenever carrier aggregation is configured at the UE.

In other cases, UE may make dynamic or per-subframe adjustments to the MTPL value for each CC of a plurality of CCs when configured for carrier aggregation. For example, MTPL adjustments may be made to both a first CC and a second CC when each CC is in a DTX on duration according to a DTX configuration, and MTPL adjustments may be made to only the first CC when the second CC does not have a transmission in a subframe based on the DTX configuration. In such cases, the UE may compute adjustments to the MTPL value depending on subframe-based network scheduling parameters at run-time, and compute MTPL per carrier and combined MTPL dynamically. In some cases, a manufacturer of the UE may specify maximum MTPL adjustment limits, and the UE may dynamically compute MTPL adjustments accordingly. Using such dynamic adjustments, the first CC (e.g. a PCC) that is requesting a maximum transmit power may be served concurrently with a second CC (e.g., a SCC) that is still provided with transmit power. The first CC MTPL adjustment for a different subframe may be computed to provide a higher transmit power in the event that the second CC does not have a transmission in that subframe. Such techniques thus enhance UE operation by providing transmission power for multiple CCs that enhances the likelihood of successful communications. Further, such techniques may make such adjustments while maintaining compliance with wireless communications standards that are set by one or more standards setting organizations.

Various aspects of the subject matter described herein may be implemented to realize one or more of the following potential advantages. The techniques employed by the described UEs may provide benefits and enhancements to the operation of a wireless communications system. For example, operations performed by the UEs may provide improvements to reliability and efficiency in communications by providing transmission power across multiple CCs for a UE that is operating in an uplink carrier aggregation mode. Such improvements may enhance efficiency of wireless communications at a UE by allowing for reliable communications on multiple CCs and also enhancing the likelihood of successful receipt of the communications at a receiving device. The described techniques may thus include features for improvements to reliability in communications, and enhanced communications efficiency for UEs and other devices of a wireless communications system, among other benefits.

Aspects of the disclosure are initially described in the context of wireless communications systems. Various examples of power determination techniques are then discussed. Aspects of the disclosure are further illustrated by and described with reference to apparatus diagrams, system diagrams, and flowcharts that relate to techniques for determining uplink power for multiple concurrent uplink transmissions.

FIG. 1 illustrates an example of a wireless communications system 100 that supports techniques for determining uplink power for multiple concurrent uplink transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $Ts=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, one or more UEs 115 may be configured for carrier aggregation in which multiple uplink CCs may be concurrently transmitted by the UE 115. In some cases, the UE 115 may apply an adjustment to a MTPL for one or more CCs when the UE 115 is configured for uplink carrier aggregation. The MTPL adjustment may be applied to reduce a transmit power of one of the CCs when a maximum transmit power is requested for the CC. The MTPL adjustment may reduce the transmit power to be less than the MTPL of the UE 115 and thereby provide that one or more other CCs may still have some transmission power. In some cases, the UE 115 may compute a MTPL adjustment on a per-subframe basis based on scheduling parameters and a requested transmit power for each CC. In some cases, a CC may be in a DTX state in which no transmissions are made on the CC for a particular subframe, and the UE 115 may adjust the MTPL value for one or more other carriers to allow for a higher transmission power in the particular subframe.

Figure 2:
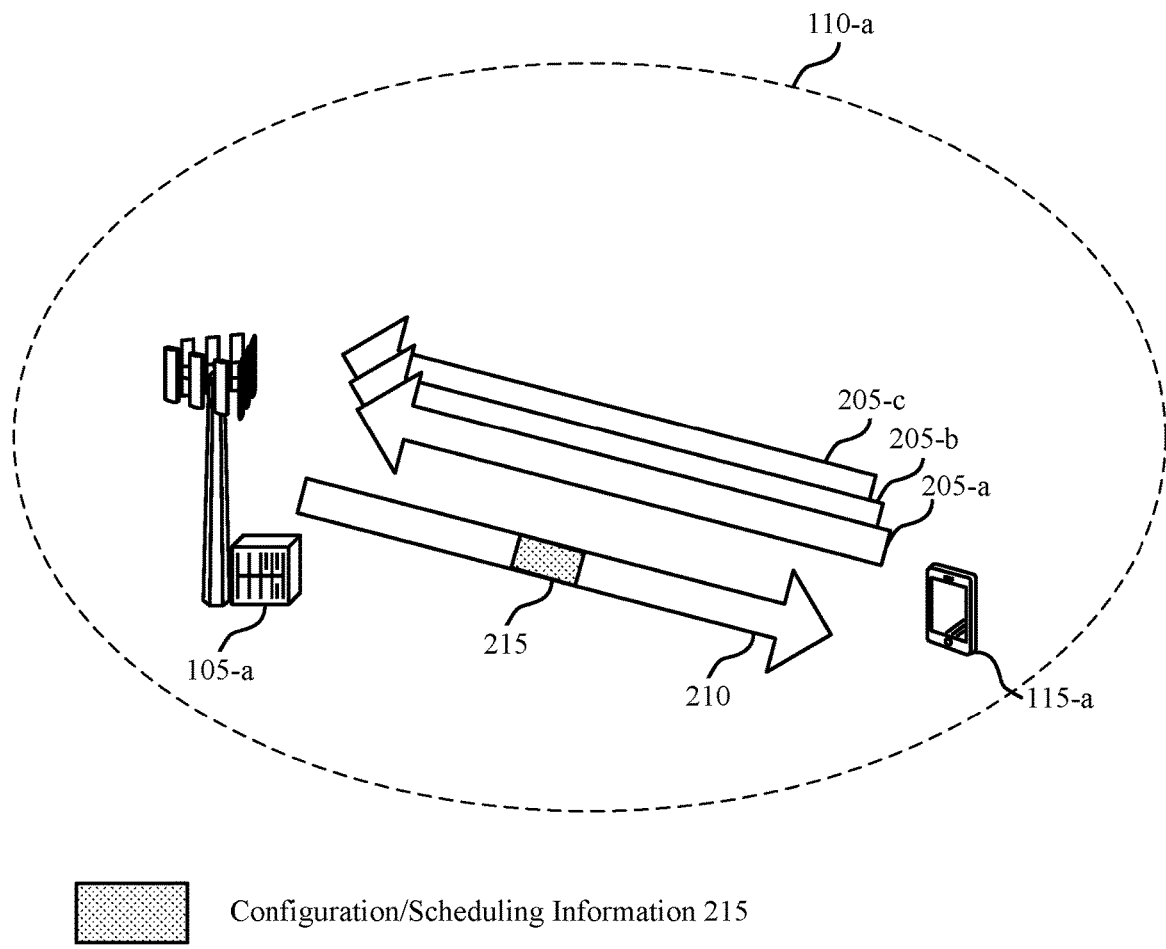
FIG. 2 illustrates an example of a portion of a wireless communications system that supports techniques for determining uplink power for multiple concurrent uplink transmissions in accordance with aspects of the present disclosure.

FIG. 2 illustrates an example of a wireless communications system 200 that supports techniques for determining uplink power for multiple concurrent uplink transmissions in accordance with aspects of the present disclosure. In some examples, wireless communications system 200 may implement aspects of wireless communications system 100. Wireless communications system 200 may include a base station 105-a and a UE 115-a which may be examples of a base station 105 and UEs 115, respectively, described with reference to FIG. 1.

In this example, the UE 115-a may be configured for carrier aggregation and use a number of uplink CCs 205 for uplink communications with the base station 105-a. In this example, a first uplink CC 205-a, a second uplink CC 205-b, and a third uplink CC 205-c may be configured for communications, although more or fewer uplink CCs 205 may be configured in other cases. Downlink communications from the base station 105-a to the UE 115-a may use a downlink CC 210. While a single downlink CC 210 is illustrated in FIG. 2, in other cases downlink carrier aggregation may be configured with multiple CCs. Further, while various examples discussed herein reference multiple uplink CCs 205 for communications with a single base station, techniques as discussed herein may be applied in cases where different CCs provide communications with different base stations or cells, in cases where different CCs may provide communications with different radio access networks, in cases where different CCs may provide communications with different radio access technologies (e.g., 4G, 5G, etc.), or any combinations thereof.

The base station 105-a may configure uplink CCs 205 and downlink CC 210 as part of a connection establishment procedure, and may transmit configuration/scheduling information 215 to the UE 115-a (e.g., that includes configuration information for communications with the base station 105-a, resource grants for uplink or downlink communications, DTX configuration information, etc.). In some cases, the UE 115-a may determine an uplink transmit power or each uplink CC 205 based on the UE 115-a configuration, requested transmission powers, and one or more power adjustment parameters. In some cases, the UE 115-a may make different power adjustment determinations based on whether carrier aggregation is configured at the UE 115-a. In some cases, the UE 115-a may apply an adjustment to an MTPL parameter for one or more of the uplink CCs 205 when the UE 115-a is configured for uplink carrier aggregation. The MTPL adjustment may be a hardware-based parameter associated with the UE 115-a (e.g., based on capabilities and tolerances of components of transceiver chains of the UE 115-a that are set by a manufacturer of the UE 115-a), and may be applied to reduce a transmit power of one or more of the uplink CCs 205 and thereby provide power distribution across multiple uplink CCs 205 even in the event that a maximum power is requested for one or more of the uplink CCs 205 (e.g., a PCC). In some cases, the UE 115-a may compute a MTPL adjustment on a per-subframe basis based on scheduling parameters and a requested transmit power for each CC. In some cases, one or more uplink CCs 205 (e.g., second uplink CC 205-b and third uplink CC 205-c) may be in a discontinuous transmission (DTX) state in which no transmissions are made on for a particular subframe, and the UE may adjust the MTPL value for one or more other carriers to allow for a higher transmission power in the particular subframe (e.g., remove the MTPL adjustment for the first uplink CC 205-*a*).

In a first example, a static MTPL adjustment may be configured, the first uplink CC 205-*a* may be a PCC on a first frequency band (e.g., LTE band 1), and may have a 25 dBm MTPL value. The second uplink CC 205-*b* may be a SCC on a second frequency band (e.g., LTE band 3) and may have a 25 dBm MTPL value. In this example, the third uplink CC 205-*c* is not configured. Further, the UE 115-*a* may be configured with a MTPL adjustment value of 0.8 dBm, which is a static adjustment that is applied with the UE 115-*a* is configured with carrier aggregation. In this example, the combined MTPL of the UE 115-*a* may be set to 25 dBm. The UE 115-*a* may apply the MTPL adjustment value to each of the uplink CCs 205 to result in an adjusted MTPL of 24.2 dBm for each uplink CC 205.

In one case, the base station 105-*a* may request a transmit power of 25 dBm on both the first uplink CC 205-*a* and the second uplink CC 205-*b*. Based on the requested transmit power and the adjusted MTPL, the UE 115-*a* may set the transmit power for the first uplink CC 205-*a* to be 24.2 dBm, and may allocate remaining available power of the UE 115-*a* to the second uplink CC 205-*b*, resulting in the transmit power for the second uplink CC 205-*b* being set at 17.2 dBm (due to the logarithmic values of the transmit powers). In another case, the base station 105-*a* may request a transit power of 25 dBm on the first uplink CC 205-*a* and request no transmission power on the second uplink CC 205-*b* (e.g., due to a DTX configuration). In such a case, the UE 115-*a* may determine the transmit power for the first uplink CC 205-*a* to be 24.2 dBm, which no transmit power for the second uplink CC 205-*b*. In this case, due to the static value of the MTPL adjustment, the first uplink CC 205-*a* has the transmission power set to 24.2 dBm even though there is no other uplink CC 205 that is transmitting.

In a second example, dynamic MTPL adjustments may be configured, the first uplink CC 205-*a* may be a PCC on a first frequency band (e.g., LTE band 1), and may have a 25 dBm MTPL value. The second uplink CC 205-*b* may be a SCC on a second frequency band (e.g., LTE band 3) and may have a 25 dBm MTPL value. In this example, the third uplink CC 205-*c* is not configured. Further, the UE 115-*a* may be configured with a maximum MTPL adjustment value of 0.8 dBm, for dynamic adjustments that are applied on a per-subframe (or other time interval, such as per-slot) when the UE 115-*a* is configured with carrier aggregation. In this example, the combined MTPL of the UE 115-*a* may be set to 25 dBm. The UE 115-*a* may apply the MTPL adjustment value to each of the uplink CCs 205 at run-time to determine uplink power.

In one case, the base station 105-*a* may request a transmit power of 25 dBm on both uplink CCs 205. The UE 115-*a* may compute the MTPL adjustment value to be 0.8 dBm as both carriers are requesting the maximum transmission power. Based on the requested transmit power and the adjusted MTPL, the UE 115-*a* may set the transmit power for the first uplink CC 205-*a* to be 24.2 dBm, and may allocate remaining available power of the UE 115-*a* to the second uplink CC 205-*b*, resulting in the transmit power for the second uplink CC 205-*b* being set at 17.2 dBm.

In another case, the base station 105-*a* may request a transmit power of 25 dBm on the first uplink CC 205-*a* and no transmit power on the second uplink CC 205-*b* (e.g., due to a DTX configuration). In this case, the UE 115-*a* may determine the MTPL adjustment to be 0 dBm on both carriers, as the second uplink CC 205-*b* receives no power and thus the transmit power of the first uplink CC 205-*a* does not need to be adjusted. This, in this case the first uplink CC 205-*a* transmits at a higher power than would be present in examples that use a static MTPL adjustment.

In a further case, the base station 105-*a* may request a transmit power of 25 dBm on the first uplink CC 205-*a* and 15 dBm on the second uplink CC 205-*b*, and the UE 115-*a* may have a combined MTPL of 25 dBm. In this case, the adjustment to the MTPL of the first uplink CC 205-*a* may be computed to be 0.46 dBm. Such a computation may be based on a computed transmit power in watts that equals the combined MTPL less the requested transmit power on the second uplink CC 205-*b* (e.g., PCC tx power=combined_MTPL-SCC requested tx power in watts). The adjusted MTPL may be computed as the combined MTPL less the computed transmit power of the first uplink CC 205-*a* (e.g., MTPL_ADJUST=(combined MTPL-PCC computed tx power) in dBm). The UE 115-*a* in such a case may then set a transmit power at 24.54 dBm on the first uplink CC 205-*a* and as 15 dBm on the second uplink CC 205-*b*. Such a technique may thus enhance the use of the maximum available headroom for the first uplink CC 205-*a* while providing the second uplink CC 205-*b* with transmit power. It is noted that in the above example that uses a static MTPL adjustment, the parameters of this case would result in the first uplink CC 205-*a* with a transmit power of 24.2 dBm and the second uplink CC 205-*b* with a transmit power of 15 dBm.

Figure 3:
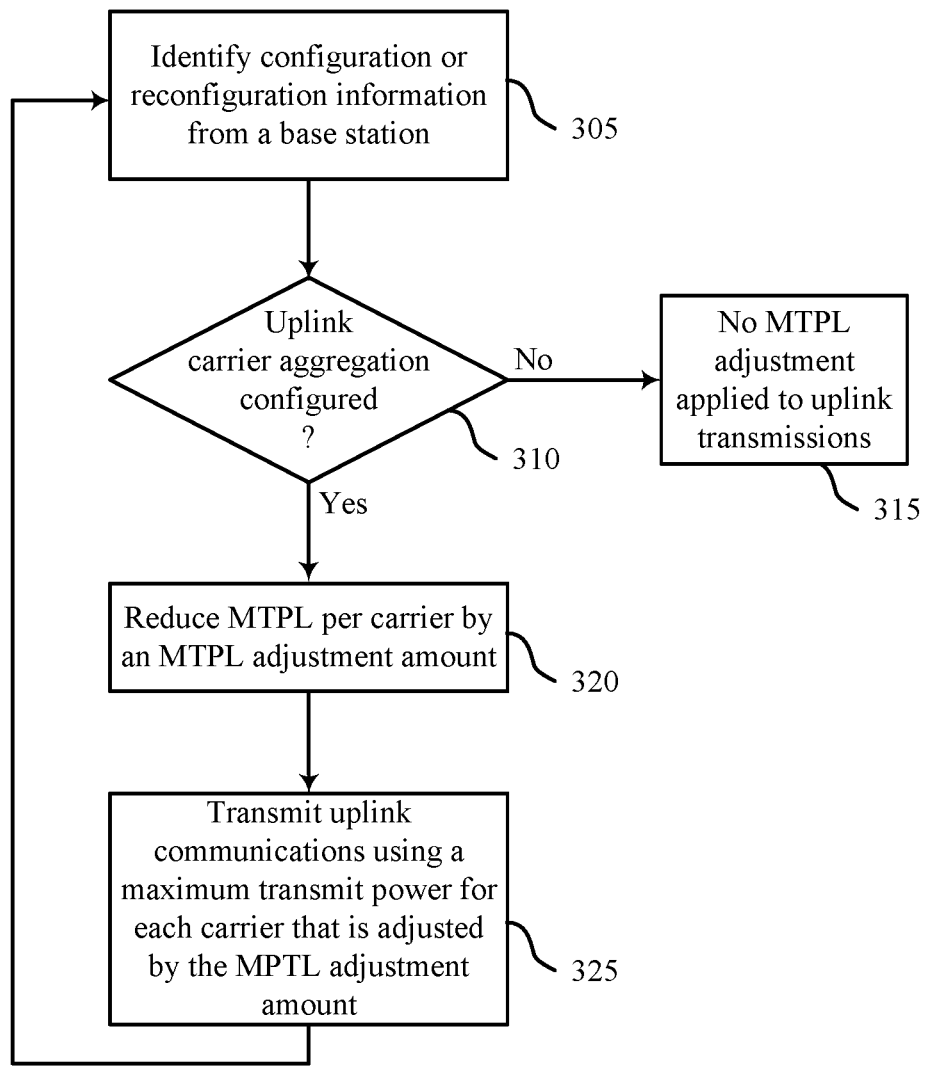
FIGS. 3 and 4 illustrate examples of flow charts illustrating techniques for determining uplink power for multiple concurrent uplink transmissions in accordance with aspects of the present disclosure.

FIG. 3 illustrates an example of a flow chart 300 that supports techniques for determining uplink power for multiple concurrent uplink transmissions in accordance with aspects of the present disclosure. In some examples, flow chart 300 may implement aspects of wireless communications system 100 or 200. The operations of flow chart 300 may be performed by a UE as discussed herein (e.g., by an uplink power manager of a wireless modem of the UE). In some examples, the UE may execute a set of instructions to control the functional elements of the UE to perform the described functions. Additionally or alternatively, a UE may perform aspects of the described functions using special-purpose hardware. While this example shows various operations in a particular order, in other examples operations may be performed in different orders, and various operations may be combined or split into separate operations.

At 305, the UE may identify configuration or reconfiguration information that is provided by a base station. In some cases, the configuration or reconfiguration information may be received by the UE as part of a RRC establishment or reestablishment procedure in which the UE is configured for communications using one or more CCs. In other cases, the configuration or reconfiguration information may be received in control information provided by the base station (e.g., in downlink control information, in a medium access control (MAC) control element, or other control information that may be provided to the UE).

At 310, the UE may determine if uplink carrier aggregation is configured. Such a determination may be based on the configuration information that is provided to the UE, which may indicate various parameters associated with configured CCs. If it is determined that uplink carrier aggregation is not configured the UE may, at 315, determine that no MTPL adjustment is to be applied to uplink transmissions.

If it is determined that uplink carrier aggregation is configured the UE may, at 320, reduce the MTPL per carrier by an MTPL adjustment amount. In some cases, the MTPL adjustment amount may be a configured adjustment value at the UE. In some cases, the MTPL adjustment amount may be a hardware-based adjustment value that is set by a manufacturer of the UE based on various UE components and associated tolerances.

At 325, the UE may transmit uplink communications using a maximum transmit power for each carrier that is adjusted by the MTPL adjustment amount. Thus, in this example, the UE may apply a static MTPL adjustment amount for each CC when it is determined that the UE is operating in a carrier aggregation mode. In other examples discussed herein, dynamic MPTL adjustments may be performed, and example of which is discussed with reference to FIG. 4.

Figure 4:
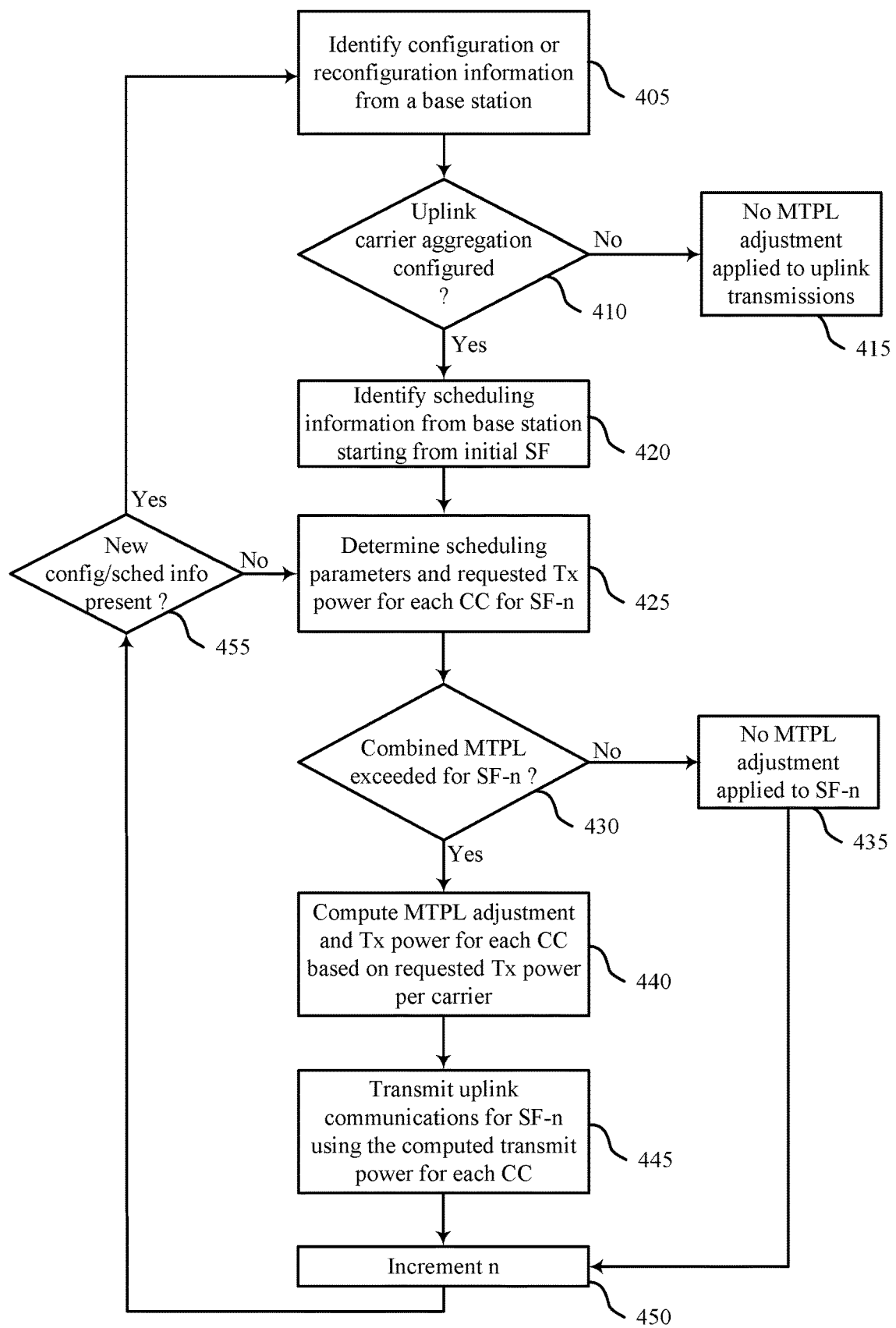

FIG. 4 illustrates an example of a flow chart 400 that supports techniques for determining uplink power for multiple concurrent uplink transmissions in accordance with aspects of the present disclosure. In some examples, flow chart 400 may implement aspects of wireless communications system 100 or 200. The operations of flow chart 400 may be performed by a UE as discussed herein (e.g., by an uplink power manager of a wireless modem of the UE). In some examples, the UE may execute a set of instructions to control the functional elements of the UE to perform the described functions. Additionally or alternatively, a UE may perform aspects of the described functions using special-purpose hardware. While this example shows various operations in a particular order, in other examples operations may be performed in different orders, and various operations may be combined or split into separate operations.

At 405, the UE may identify configuration or reconfiguration information that is provided by a base station. In some cases, the configuration or reconfiguration information may be received by the UE as part of a RRC establishment or reestablishment procedure in which the UE is configured for communications using one or more CCs. In other cases, the configuration or reconfiguration information may be received in control information provided by the base station (e.g., in downlink control information, in a medium access control (MAC) control element, or other control information that may be provided to the UE).

At 410, the UE may determine if uplink carrier aggregation is configured. Such a determination may be based on the configuration information that is provided to the UE, which may indicate various parameters associated with configured CCs. If it is determined that uplink carrier aggregation is not configured the UE may, at 415, determine that no MTPL adjustment is to be applied to uplink transmissions.

If it is determined that uplink carrier aggregation is configured the UE may, at 420, identify scheduling information that is provided by the base station starting from an initial subframe (or other time period, such as from an initial slot). The scheduling information may include information related to resource allocations for each CC, modulation and coding that is applied for each CC, DTX configuration information for each CC, and the like.

At 425, the UE may determine scheduling parameters and requested transmit power for each CC for a subframe (e.g., subframe n). The scheduling parameters may be provided in the scheduling information, determined based on the scheduling information, or combinations thereof. For example, the scheduling parameters may include an indication of a requested transmission power, a DTX status of each CC based on a DTX configuration indicated in the scheduling information, and a modulation order for each CC.

At 430, the UE may determine whether the combined MTPL of the UE is exceeded for the subframe (e.g., subframe n). Such a determination may be based on the requested transmit power for each CC for the subframe. For example, if each of a first CC and a second CC request a transmit power of 15 dBm the UE may determine that the combined MTPL of the UE is not exceeded. In another example, the UE may determine that the first CC is to transmit in the subframe but that other CC(s) are not to transmit due to a DTX configuration, and thus determine that the combined MTPL of the UE is not exceeded. However, if each of the first CC and second CC request a transmit power of 25 dBm the UE may determine that the combined MTPL of the UE is exceeded.

If it is determined that the MTPL of the UE is not exceeded for the subframe, the UE, at 435, may determine that no MTPL adjustment is to be applied for the subframe. If it is determined that the MTPL of the UE is exceeded for the subframe, at 440, the UE may compute a MTPL adjustment and transmit power for each CC based on the requested transmit power for each CC. Such computations of the MTPL adjustment and transmit power may be made for each CC in accordance with techniques discussed herein, that account for scheduling parameters (e.g., requested transmit power) of each other CC.

At 445, the UE may transmit the uplink communications for the subframe using the computed transmit power for each CC. At 450, the UE may increment the subframe for continued run-time determinations of transmit powers and MTPL adjustments for subsequent subframes. At 455, the UE may determine whether new configuration or scheduling information is present at the UE. In the event that no new scheduling or configuration information is present, the operations at 425 may be performed. In the event that new configuration or scheduling information is present, the operations at 405 may be performed.

Figure 5:
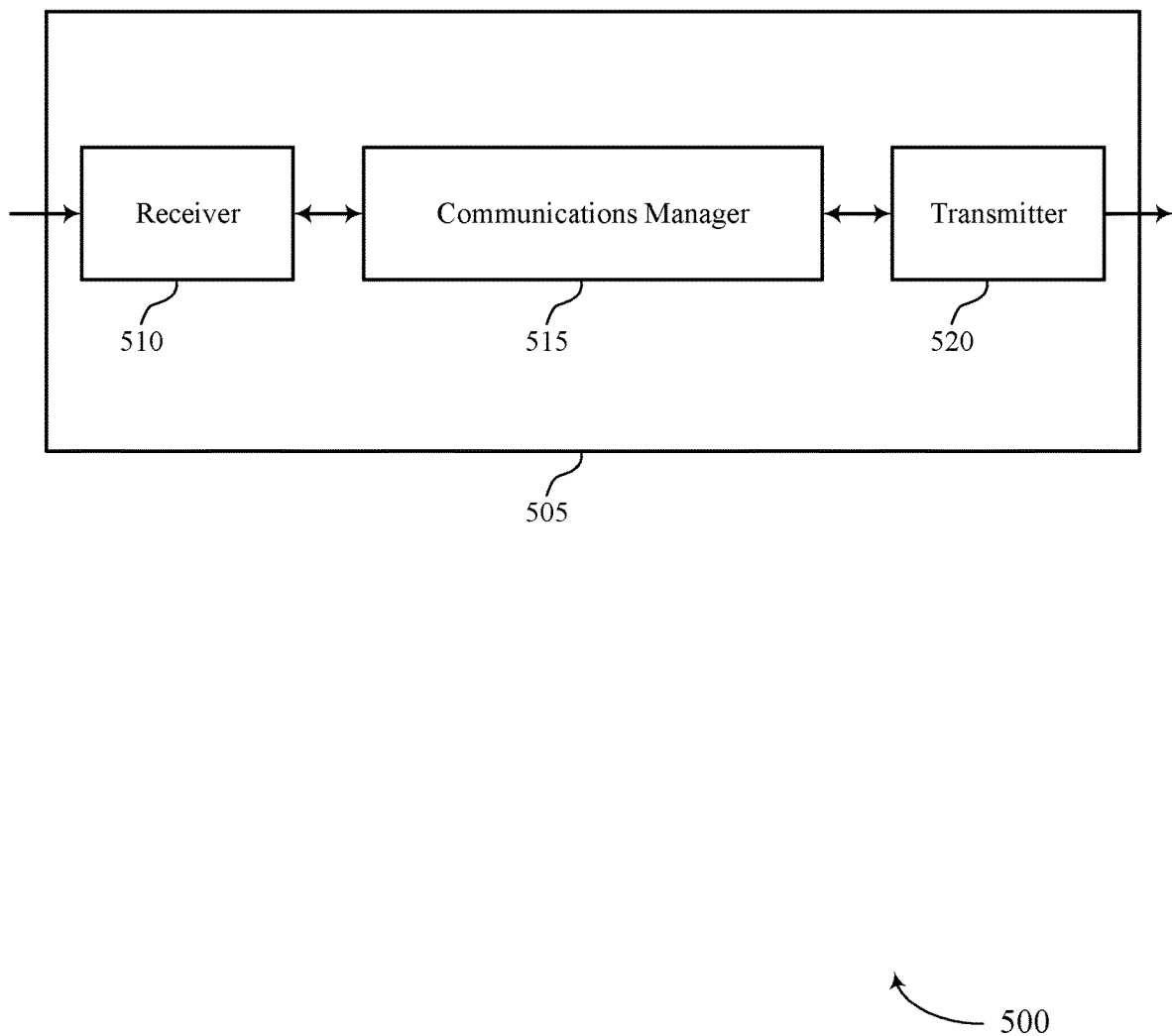
FIGS. 5 and 6 show block diagrams of devices that support techniques for determining uplink power for multiple concurrent uplink transmissions in accordance with aspects of the present disclosure.

FIG. 5 shows a block diagram 500 of a device 505 that supports techniques for determining uplink power for multiple concurrent uplink transmissions in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for determining uplink power for multiple concurrent uplink transmissions, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive scheduling information from a base station for a set of subframes, determine, based on the scheduling information, one or more scheduling parameters for each of a set of component carriers used for uplink communications with the base station, calculate, for each subframe of the set of subframes based on the one or more scheduling parameters, a power adjustment to a maximum transmit power limit for the each of the set of component carriers, where a first power adjustment for a first component carrier of the set of component carriers is determined based on a second scheduling parameter of a second component carrier, and a second power adjustment for the second component carrier of the set of component carriers is based on a first scheduling parameter of the first component carrier, and transmit uplink communications to the base station in each subframe using one or more of the set of component carriers with a transmit power for each component carrier that is based on the calculating.

The communications manager 515 may also determine whether the UE is configured for uplink communications using uplink carrier aggregation of a set of uplink component carriers, adjust a maximum uplink transmit power of each component carrier of the set of uplink component carriers based on determining that the UE is configured for uplink communications using uplink carrier aggregation, and transmit uplink communications to a base station using at least a first component carrier of the set of component carriers using an uplink transmit power that is at or below the adjusted maximum uplink transmit power of the first component carrier. The communications manager 515 may be an example of aspects of the communications manager 810 described herein.

The communications manager 515 as described herein may be implemented to realize one or more potential advantages. One implementation may allow the device 505 to provide transmission power across multiple CCs for a UE that is operating in an uplink carrier aggregation mode. Such operations may provide improvements to reliability and efficiency in communications on multiple CCs. Such improvements may enhance efficiency of wireless communications at a UE by allowing for transmission power determination based on carrier aggregation status of the UE, particular transmission parameters for each of a number of subframes, or combinations thereof. As such, supported techniques may provide for improvements to reliability in communications, and enhanced communications efficiency for UEs and other devices of a wireless communications system, among other benefits.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
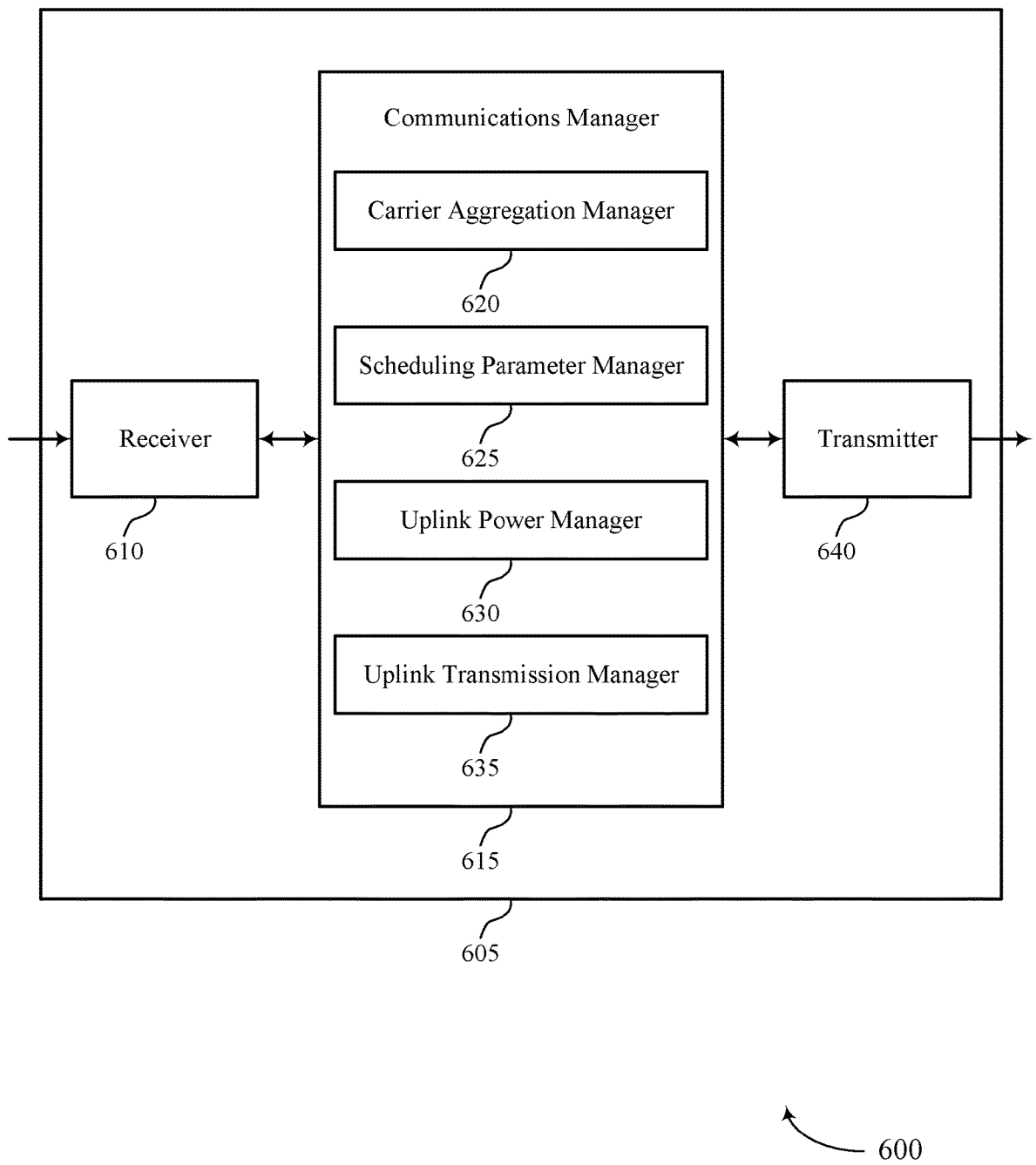

FIG. 6 shows a block diagram 600 of a device 605 that supports techniques for determining uplink power for multiple concurrent uplink transmissions in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to techniques for determining uplink power for multiple concurrent uplink transmissions, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a carrier aggregation manager 620, a scheduling parameter manager 625, an uplink power manager 630, and an uplink transmission manager 635. The communications manager 615 may be an example of aspects of the communications manager 810 described herein.

In some cases, the carrier aggregation manager 620 may receive scheduling information from a base station for a set of subframes. The scheduling parameter manager 625 may determine, based on the scheduling information, one or more scheduling parameters for each of a set of component carriers used for uplink communications with the base station. The uplink power manager 630 may calculate, for each subframe of the set of subframes based on the one or more scheduling parameters, a power adjustment to a maximum transmit power limit for the each of the set of component carriers, where a first power adjustment for a first component carrier of the set of component carriers is determined based on a second scheduling parameter of a second component carrier, and a second power adjustment for the second component carrier of the set of component carriers is based on a first scheduling parameter of the first component carrier. The uplink transmission manager 635 may transmit uplink communications to the base station in each subframe using one or more of the set of component carriers with a transmit power for each component carrier that is based on the calculating.

In some cases, the carrier aggregation manager 620 may determine whether the UE is configured for uplink communications using uplink carrier aggregation of a set of uplink component carriers. The uplink power manager 630 may adjust a maximum uplink transmit power of each component carrier of the set of uplink component carriers based on determining that the UE is configured for uplink communications using uplink carrier aggregation. The uplink transmission manager 635 may transmit uplink communications to a base station using at least a first component carrier of the set of component carriers using an uplink transmit power that is at or below the adjusted maximum uplink transmit power of the first component carrier.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
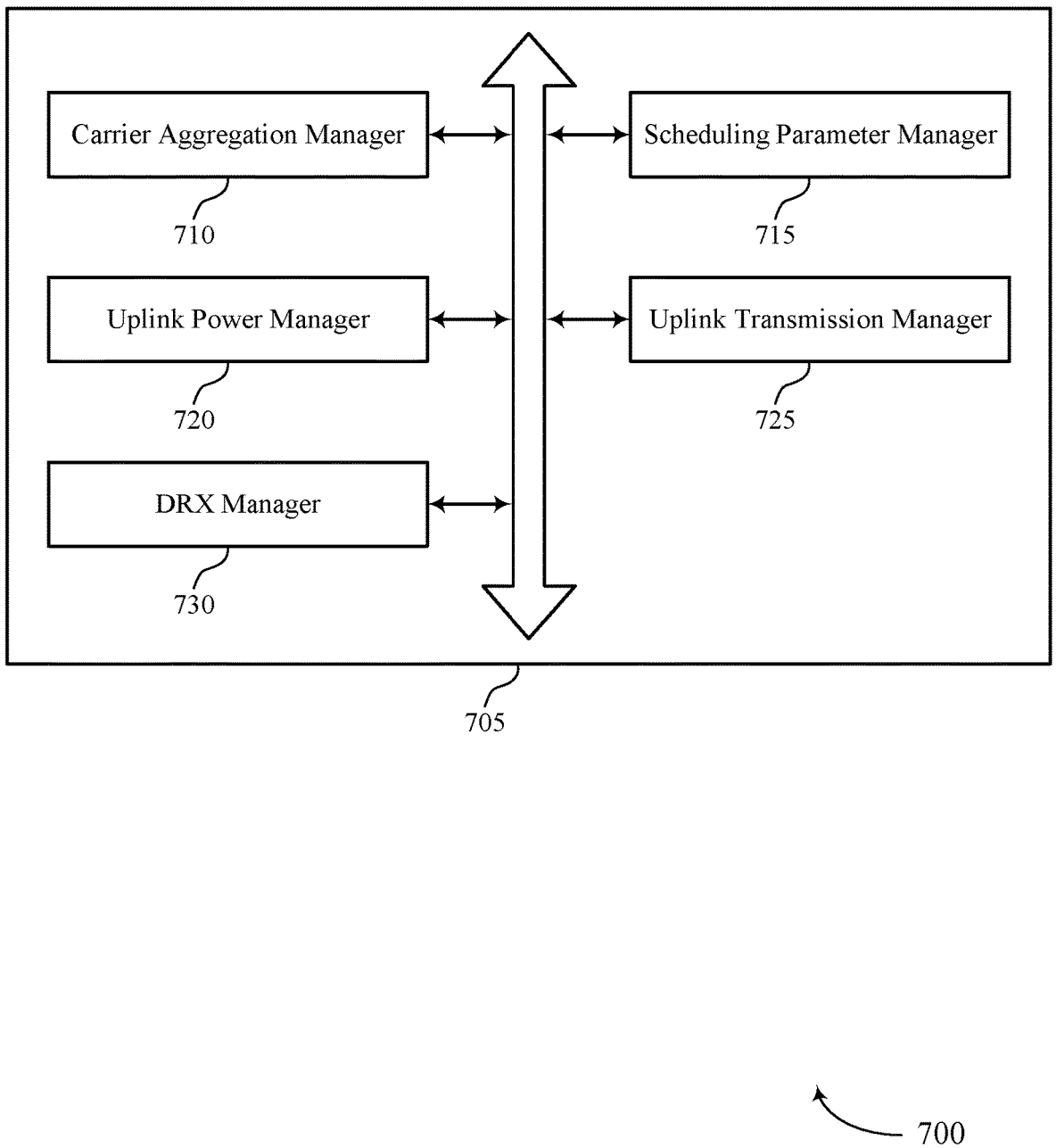
FIG. 7 shows a block diagram of a communications manager that supports techniques for determining uplink power for multiple concurrent uplink transmissions in accordance with aspects of the present disclosure.

FIG. 7 shows a block diagram 700 of a communications manager 705 that supports techniques for determining uplink power for multiple concurrent uplink transmissions in accordance with aspects of the present disclosure. The communications manager 705 may be an example of aspects of a communications manager 515, a communications manager 615, or a communications manager 810 described herein. The communications manager 705 may include a carrier aggregation manager 710, a scheduling parameter manager 715, an uplink power manager 720, an uplink transmission manager 725, and a DRX manager 730. Each of these modules may communicate, directly or indirectly, with one another (e.g., via one or more buses).

The carrier aggregation manager 710 may receive scheduling information from a base station for a set of subframes. In some examples, the carrier aggregation manager 710 may determine whether the UE is configured for uplink communications using uplink carrier aggregation of a set of uplink component carriers. In some cases, the first component carrier is a primary component carrier configured by the base station, and the second component carrier is a secondary component carrier configured by the base station. In some cases, the first component carrier is configured for a first RAT, and the second component carrier is configured for a second RAT. In some cases, the first RAT and the second RAT are accessed using different SIMs of the UE.

In some examples, the carrier aggregation manager 710 may determine that the UE is reconfigured to remove the uplink carrier aggregation configuration and that uplink communications are to use a single component carrier. In some examples, the carrier aggregation manager 710 may discontinue adjustment of the maximum uplink transmit power.

The scheduling parameter manager 715 may determine, based on the scheduling information, one or more scheduling parameters for each of a set of component carriers used for uplink communications with the base station.

The uplink power manager 720 may calculate, for each subframe of the set of subframes based on the one or more scheduling parameters, a power adjustment to a maximum transmit power limit for the each of the set of component carriers, where a first power adjustment for a first component carrier of the set of component carriers is determined based on a second scheduling parameter of a second component carrier, and a second power adjustment for the second component carrier of the set of component carriers is based on a first scheduling parameter of the first component carrier. In some examples, the uplink power manager 720 may determine that a maximum available UE transmit power is requested for the first component carrier for a first subframe, and where the power adjustment provides power for the second component carrier and maintains a combined transmit power of the UE at or below a combined maximum transmit power limit of the UE. In some examples, the uplink power manager 720 may reduce a maximum transmit power limit of each of the two or more uplink component carriers by a maximum transmit power adjustment value of the UE. In some cases, the power adjustment is based on scheduling information for the set of subframes indicating whether data is to be transferred using each component carrier of the set of component carriers for each subframe. In some cases, the power adjustment is further based on a maximum allowed value of the power adjustment.

In some examples, the uplink power manager 720 may adjust a maximum uplink transmit power of each component carrier of the set of uplink component carriers based on determining that the UE is configured for uplink communications using uplink carrier aggregation. In some examples, the uplink power manager 720 may apply a static hardware-based power adjustment to a maximum transmit power limit of each component carriers of the set of uplink component carriers.

In some cases, the power adjustment is based on a power class of the UE. In some cases, the maximum transmit power limit and the maximum transmit power adjustment value are hardware-based parameters of the UE.

In some cases, the adjusting the maximum uplink transmit power of the first component carrier allows the UE to allocate transmit power to a second component carrier when the base station requests a maximum available transmit power for an uplink transmission of the first component carrier, and where a combined transmit power of the first component carrier and the second component carrier remains at or below a combined maximum transmit power limit of the UE.

The uplink transmission manager 725 may transmit uplink communications to the base station in each subframe using one or more of the set of component carriers with a transmit power for each component carrier that is based on the calculating. In some examples, the uplink transmission manager 725 may transmit uplink communications to a base station using at least a first component carrier of the set of component carriers using an uplink transmit power that is at or below the adjusted maximum uplink transmit power of the first component carrier.

The DRX manager 730 may determine, based on a discontinuous reception configuration of the second component carrier, that the second component carrier is unscheduled for uplink communications in a first subframe. In some examples, the DRX manager 730 may set the second transmit power to zero for the first subframe based on the discontinuous reception configuration. In some examples, the DRX manager 730 may determine the power adjustment to the maximum transmit power limit for the first component carrier for the first subframe based on the setting the second transmit power to zero for the first subframe.

Figure 8:
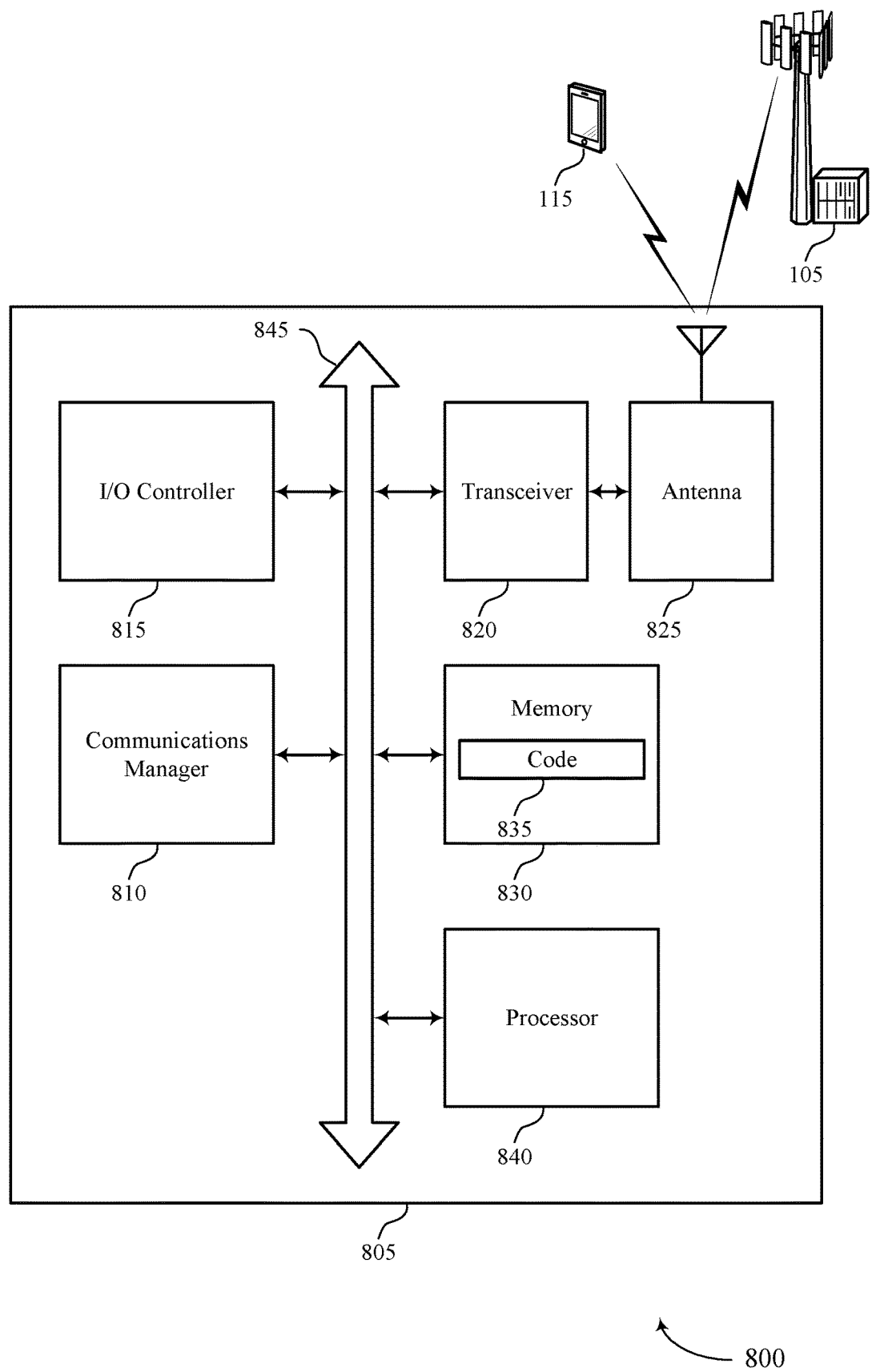
FIG. 8 shows a diagram of a system including a device that supports techniques for determining uplink power for multiple concurrent uplink transmissions in accordance with aspects of the present disclosure.

FIG. 8 shows a diagram of a system 800 including a device 805 that supports techniques for determining uplink power for multiple concurrent uplink transmissions in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive scheduling information from a base station for a set of subframes, determine, based on the scheduling information, one or more scheduling parameters for each of a set of component carriers used for uplink communications with the base station, calculate, for each subframe of the set of subframes based on the one or more scheduling parameters, a power adjustment to a maximum transmit power limit for the each of the set of component carriers, where a first power adjustment for a first component carrier of the set of component carriers is determined based on a second scheduling parameter of a second component carrier, and a second power adjustment for the second component carrier of the set of component carriers is based on a first scheduling parameter of the first component carrier, and transmit uplink communications to the base station in each subframe using one or more of the set of component carriers with a transmit power for each component carrier that is based on the calculating.

The communications manager 810 may also determine whether the UE is configured for uplink communications using uplink carrier aggregation of a set of uplink component carriers, adjust a maximum uplink transmit power of each component carrier of the set of uplink component carriers based on determining that the UE is configured for uplink communications using uplink carrier aggregation, and transmit uplink communications to a base station using at least a first component carrier of the set of component carriers using an uplink transmit power that is at or below the adjusted maximum uplink transmit power of the first component carrier.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for determining uplink power for multiple concurrent uplink transmissions).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
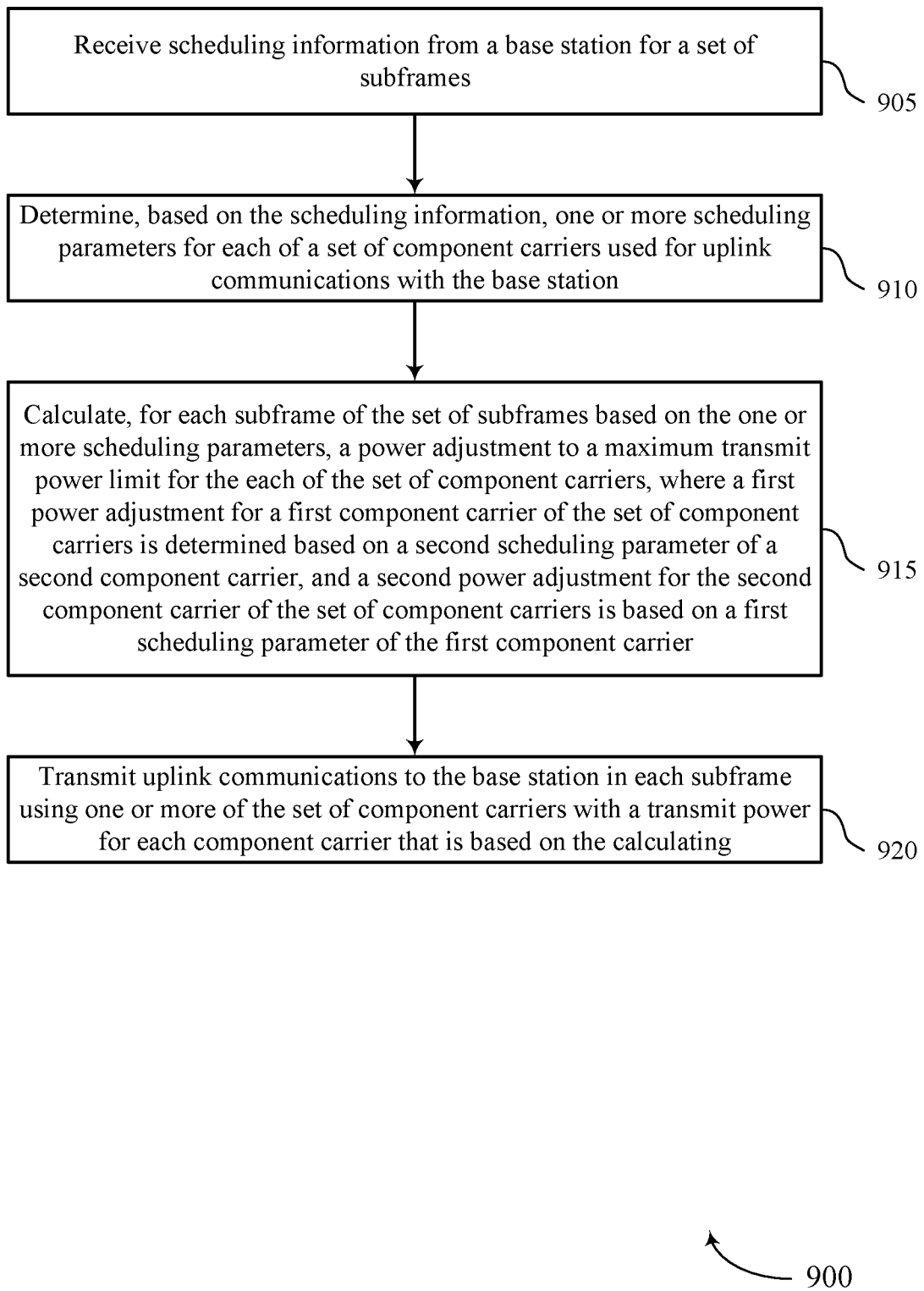
FIGS. 9 through 13 show flow charts illustrating methods that support techniques for determining uplink power for multiple concurrent uplink transmissions in accordance with aspects of the present disclosure.

FIG. 9 shows a flowchart illustrating a method 900 that supports techniques for determining uplink power for multiple concurrent uplink transmissions in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 905, the UE may receive scheduling information from a base station for a set of subframes. The operations of 905 may be performed according to the methods described herein. In some examples, aspects of the operations of 905 may be performed by a carrier aggregation manager as described with reference to FIGS. 5 through 8.

At 910, the UE may determine, based on the scheduling information, one or more scheduling parameters for each of a set of component carriers used for uplink communications with the base station. The operations of 910 may be performed according to the methods described herein. In some examples, aspects of the operations of 910 may be performed by a scheduling parameter manager as described with reference to FIGS. 5 through 8. In some cases, a first component carrier of the set of component carriers is a primary component carrier configured by the base station, and a second component carrier is a secondary component carrier configured by the base station. In some cases, the first component carrier is configured for a first RAT, and the second component carrier is configured for a second RAT.

At 915, the UE may calculate, for each subframe of the set of subframes based on the one or more scheduling parameters, a power adjustment to a maximum transmit power limit for the each of the set of component carriers, where a first power adjustment for a first component carrier of the set of component carriers is determined based on a second scheduling parameter of a second component carrier, and a second power adjustment for the second component carrier of the set of component carriers is based on a first scheduling parameter of the first component carrier. The operations of 915 may be performed according to the methods described herein. In some examples, aspects of the operations of 915 may be performed by an uplink power manager as described with reference to FIGS. 5 through 8. In some cases, the power adjustment is based on scheduling information for the set of subframes indicating whether data is to be transferred using each component carrier of the set of component carriers for each subframe. In some cases, the power adjustment is further based on a maximum allowed value of the power adjustment. In some cases, the power adjustment is based on a power class of the UE.

At 920, the UE may transmit uplink communications to the base station in each subframe using one or more of the set of component carriers with a transmit power for each component carrier that is based on the calculating. The operations of 920 may be performed according to the methods described herein. In some examples, aspects of the operations of 920 may be performed by an uplink transmission manager as described with reference to FIGS. 5 through 8.

Figure 10:
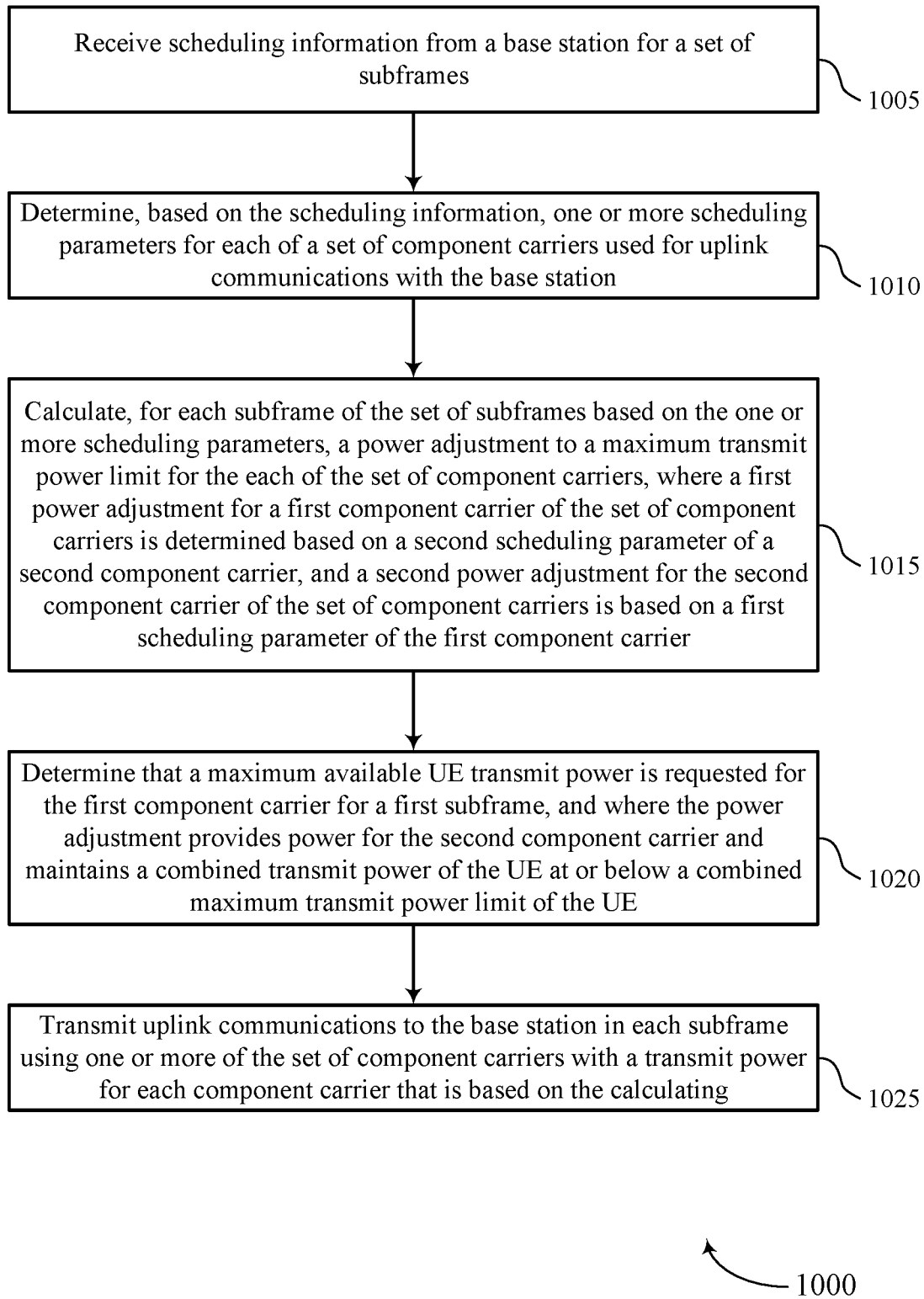

FIG. 10 shows a flowchart illustrating a method 1000 that supports techniques for determining uplink power for multiple concurrent uplink transmissions in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1005, the UE may receive scheduling information from a base station for a set of subframes. The operations of 1005 may be performed according to the methods described herein. In some examples, aspects of the operations of 1005 may be performed by a carrier aggregation manager as described with reference to FIGS. 5 through 8.

At 1010, the UE may determine, based on the scheduling information, one or more scheduling parameters for each of a set of component carriers used for uplink communications with the base station. The operations of 1010 may be performed according to the methods described herein. In some examples, aspects of the operations of 1010 may be performed by a scheduling parameter manager as described with reference to FIGS. 5 through 8.

At 1015, the UE may calculate, for each subframe of the set of subframes based on the one or more scheduling parameters, a power adjustment to a maximum transmit power limit for the each of the set of component carriers, where a first power adjustment for a first component carrier of the set of component carriers is determined based on a second scheduling parameter of a second component carrier, and a second power adjustment for the second component carrier of the set of component carriers is based on a first scheduling parameter of the first component carrier. The operations of 1015 may be performed according to the methods described herein. In some examples, aspects of the operations of 1015 may be performed by an uplink power manager as described with reference to FIGS. 5 through 8.

At 1020, the UE may determine that a maximum available UE transmit power is requested for the first component carrier for a first subframe, and where the power adjustment provides power for the second component carrier and maintains a combined transmit power of the UE at or below a combined maximum transmit power limit of the UE. The operations of 1020 may be performed according to the methods described herein. In some examples, aspects of the operations of 1020 may be performed by an uplink power manager as described with reference to FIGS. 5 through 8.

At 1025, the UE may transmit uplink communications to the base station in each subframe using one or more of the set of component carriers with a transmit power for each component carrier that is based on the calculating. The operations of 1025 may be performed according to the methods described herein. In some examples, aspects of the operations of 1025 may be performed by an uplink transmission manager as described with reference to FIGS. 5 through 8.

Figure 11:
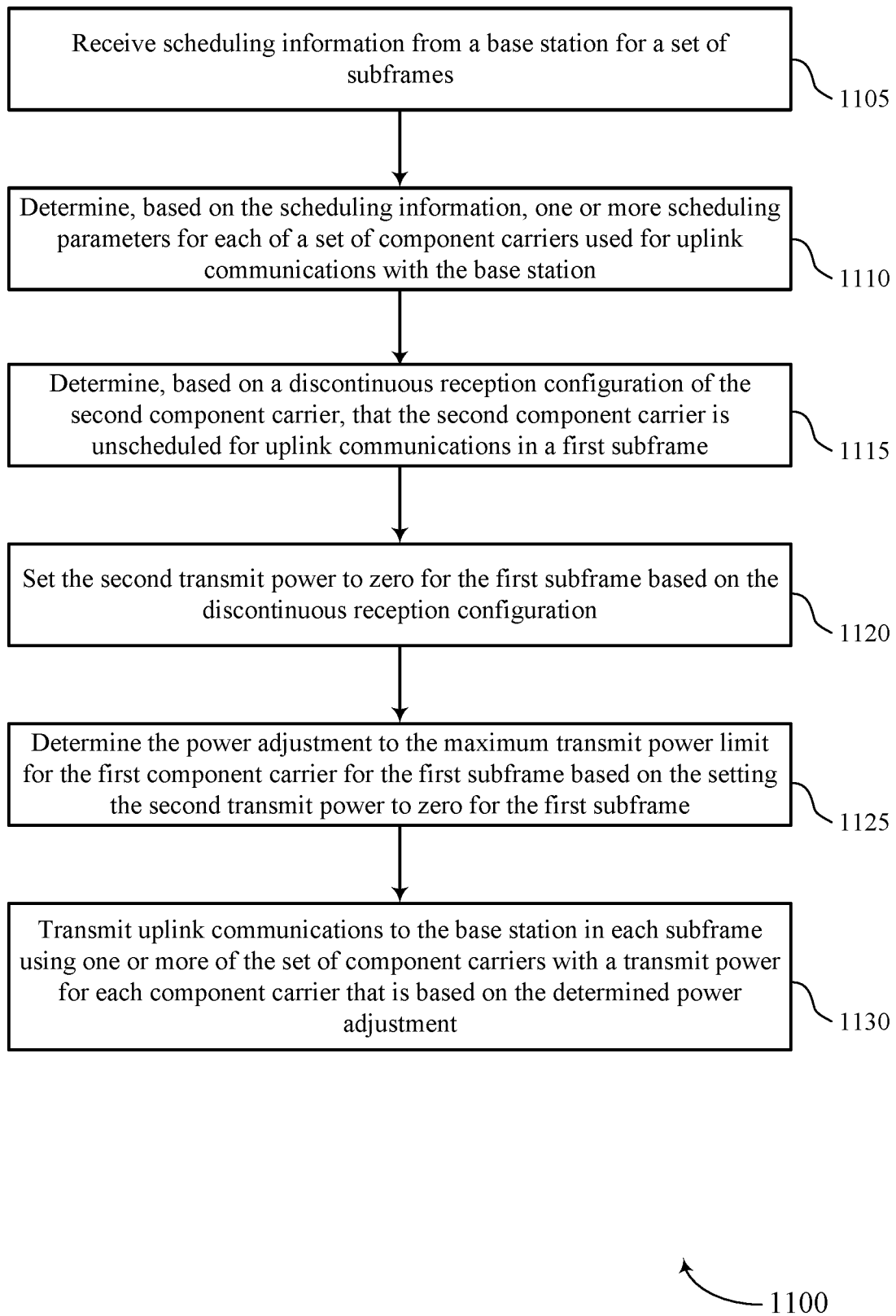

FIG. 11 shows a flowchart illustrating a method 1100 that supports techniques for determining uplink power for multiple concurrent uplink transmissions in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1105, the UE may receive scheduling information from a base station for a set of subframes. The operations of 1105 may be performed according to the methods described herein. In some examples, aspects of the operations of 1105 may be performed by a carrier aggregation manager as described with reference to FIGS. 5 through 8.

At 1110, the UE may determine, based on the scheduling information, one or more scheduling parameters for each of a set of component carriers used for uplink communications with the base station. The operations of 1110 may be performed according to the methods described herein. In some examples, aspects of the operations of 1110 may be performed by a scheduling parameter manager as described with reference to FIGS. 5 through 8.

At 1115, the UE may determine, based on a discontinuous reception configuration of a second component carrier, that the second component carrier is unscheduled for uplink communications in a first subframe. The operations of 1115 may be performed according to the methods described herein. In some examples, aspects of the operations of 1115 may be performed by a DRX manager as described with reference to FIGS. 5 through 8.

At 1120, the UE may set the second transmit power to zero for the first subframe based on the discontinuous reception configuration. The operations of 1120 may be performed according to the methods described herein. In some examples, aspects of the operations of 1120 may be performed by a DRX manager as described with reference to FIGS. 5 through 8.

At 1125, the UE may determine the power adjustment to the maximum transmit power limit for a first component carrier for the first subframe based on the setting the second transmit power to zero for the first subframe. The operations of 1125 may be performed according to the methods described herein. In some examples, aspects of the operations of 1125 may be performed by a DRX manager as described with reference to FIGS. 5 through 8.

At 1130, the UE may transmit uplink communications to the base station in each subframe using one or more of the set of component carriers with a transmit power for each component carrier that is based on the determined power adjustment. The operations of 1130 may be performed according to the methods described herein. In some examples, aspects of the operations of 1130 may be performed by an uplink transmission manager as described with reference to FIGS. 5 through 8.

Figure 12:
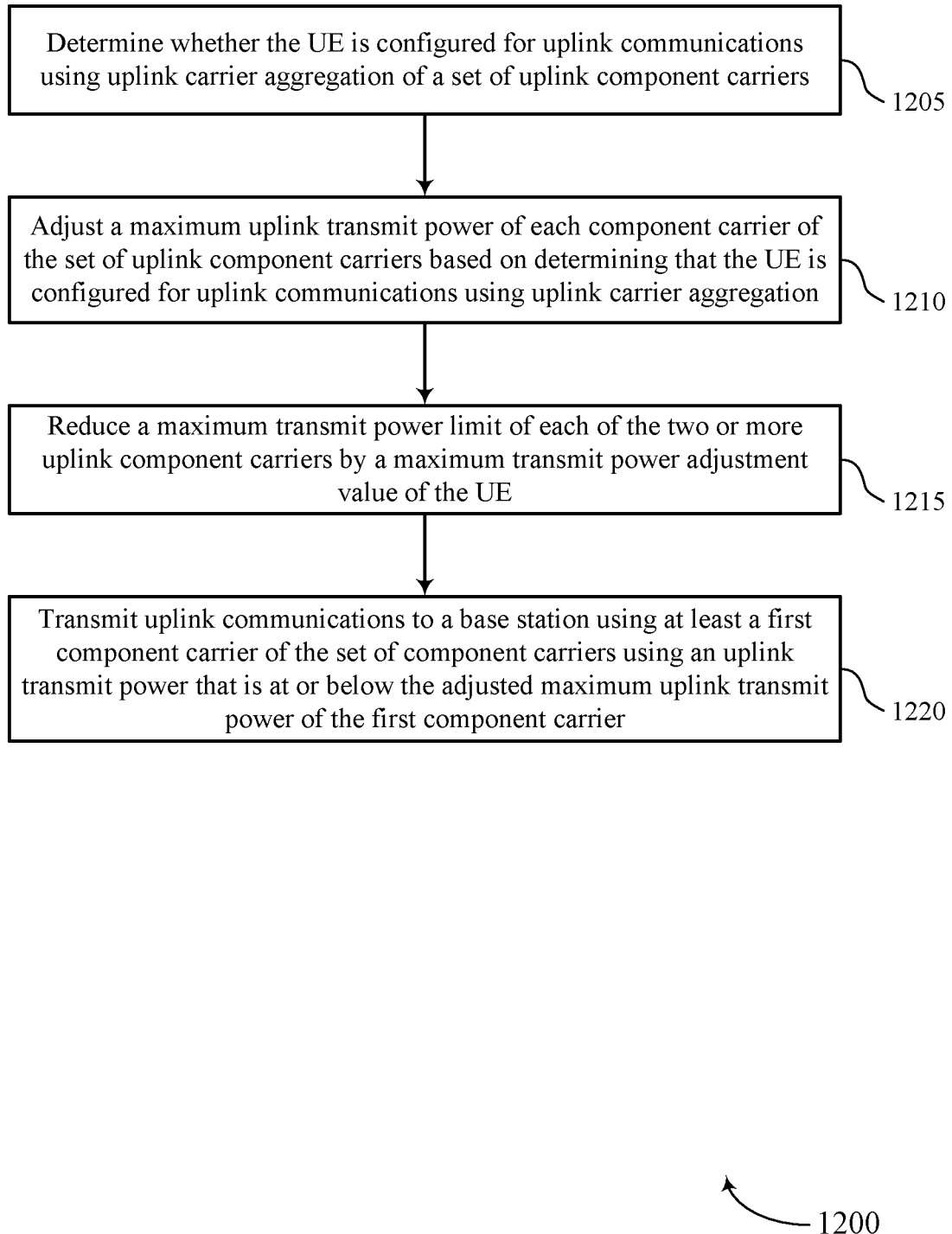

FIG. 12 shows a flowchart illustrating a method 1200 that supports techniques for determining uplink power for multiple concurrent uplink transmissions in accordance with aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1205, the UE may determine whether the UE is configured for uplink communications using uplink carrier aggregation of a set of uplink component carriers. The operations of 1205 may be performed according to the methods described herein. In some examples, aspects of the operations of 1205 may be performed by a carrier aggregation manager as described with reference to FIGS. 5 through 8.

At 1210, the UE may adjust a maximum uplink transmit power of each component carrier of the set of uplink component carriers based on determining that the UE is configured for uplink communications using uplink carrier aggregation. The operations of 1210 may be performed according to the methods described herein. In some examples, aspects of the operations of 1210 may be performed by an uplink power manager as described with reference to FIGS. 5 through 8. In some cases, the maximum transmit power limit and the maximum transmit power adjustment value are hardware-based parameters of the UE. In some cases, the adjusting the maximum uplink transmit power of the first component carrier allows the UE to allocate transmit power to a second component carrier when the base station requests a maximum available transmit power for an uplink transmission of the first component carrier, and where a combined transmit power of the first component carrier and the second component carrier remains at or below a combined maximum transmit power limit of the UE. In some cases, the UE may apply a static hardware-based power adjustment to a maximum transmit power limit of each component carriers of the set of uplink component carriers. In some cases, the adjusting the maximum uplink transmit power is further based on a power class of the UE.

At 1215, the UE may reduce a maximum transmit power limit of each of the two or more uplink component carriers by a maximum transmit power adjustment value of the UE. The operations of 1215 may be performed according to the methods described herein. In some examples, aspects of the operations of 1215 may be performed by an uplink power manager as described with reference to FIGS. 5 through 8.

At 1220, the UE may transmit uplink communications to a base station using at least a first component carrier of the set of component carriers using an uplink transmit power that is at or below the adjusted maximum uplink transmit power of the first component carrier. The operations of 1220 may be performed according to the methods described herein. In some examples, aspects of the operations of 1220 may be performed by an uplink transmission manager as described with reference to FIGS. 5 through 8. In some cases, the first component carrier is a primary component carrier configured by the base station, and a second component carrier of the set of component carriers is a secondary component carrier configured by the base station. In some cases, the first component carrier is configured for a first RAT, and a second component carrier of the set of component carriers is configured for a second RAT.

Figure 13:
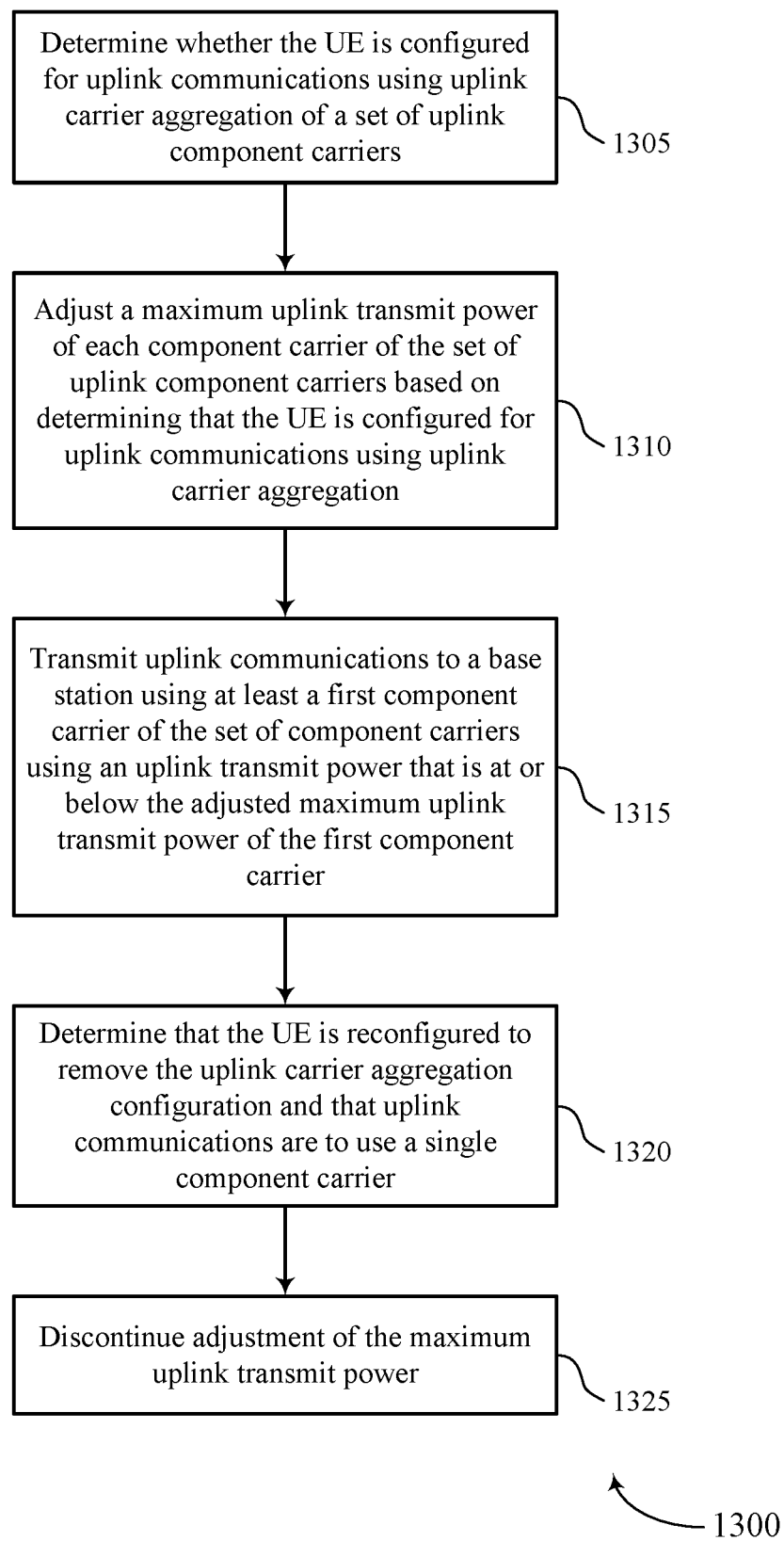

FIG. 13 shows a flowchart illustrating a method 1300 that supports techniques for determining uplink power for multiple concurrent uplink transmissions in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1305, the UE may determine whether the UE is configured for uplink communications using uplink carrier aggregation of a set of uplink component carriers. The operations of 1305 may be performed according to the methods described herein. In some examples, aspects of the operations of 1305 may be performed by a carrier aggregation manager as described with reference to FIGS. 5 through 8.

At 1310, the UE may adjust a maximum uplink transmit power of each component carrier of the set of uplink component carriers based on determining that the UE is configured for uplink communications using uplink carrier aggregation. The operations of 1310 may be performed according to the methods described herein. In some examples, aspects of the operations of 1310 may be performed by an uplink power manager as described with reference to FIGS. 5 through 8.

At 1315, the UE may transmit uplink communications to a base station using at least a first component carrier of the set of component carriers using an uplink transmit power that is at or below the adjusted maximum uplink transmit power of the first component carrier. The operations of 1315 may be performed according to the methods described herein. In some examples, aspects of the operations of 1315 may be performed by an uplink transmission manager as described with reference to FIGS. 5 through 8.

At 1320, the UE may determine that the UE is reconfigured to remove the uplink carrier aggregation configuration and that uplink communications are to use a single component carrier. The operations of 1320 may be performed according to the methods described herein. In some examples, aspects of the operations of 1320 may be performed by a carrier aggregation manager as described with reference to FIGS. 5 through 8.

At 1325, the UE may discontinue adjustment of the maximum uplink transmit power. The operations of 1325 may be performed according to the methods described herein. In some examples, aspects of the operations of 1325 may be performed by a carrier aggregation manager as described with reference to FIGS. 5 through 8.

The following provides an overview of aspects of the present disclosure:

Aspect 1: A method for wireless communication at a UE, comprising: receiving scheduling information from a base station for a plurality of subframes; determining, based at least in part on the scheduling information, one or more scheduling parameters for each of a plurality of component carriers used for uplink communications with the base station; calculating, for each subframe of the plurality of subframes based at least in part on the one or more scheduling parameters, a power adjustment to a maximum transmit power limit for the each of the plurality of component carriers, wherein a first power adjustment for a first component carrier of the plurality of component carriers is determined based at least in part on a second scheduling parameter of a second component carrier, and a second power adjustment for the second component carrier of the plurality of component carriers is based at least in part on a first scheduling parameter of the first component carrier; and transmitting uplink communications to the base station in each subframe using one or more of the plurality of component carriers with a transmit power for each component carrier that is based at least in part on the calculating.

Aspect 2: The method of aspect 1, wherein the power adjustment is based at least in part on scheduling information for the plurality of subframes indicating whether data is to be transferred using each component carrier of the plurality of component carriers for each subframe.

Aspect 3: The method of any of aspects 1 through 2, wherein the power adjustment is further based at least in part on a maximum allowed value of the power adjustment.

Aspect 4: The method of any of aspects 1 through 3, further comprising: determining that a maximum available UE transmit power is requested for the first component carrier for a first subframe, and wherein the power adjustment provides power for the second component carrier and maintains a combined transmit power of the UE at or below a combined maximum transmit power limit of the UE.

Aspect 5: The method of any of aspects 1 through 4, wherein the calculating further comprises: determining, based at least in part on a discontinuous reception configuration of the second component carrier, that the second component carrier is unscheduled for uplink communications in a first subframe; setting the second transmit power to zero for the first subframe based at least in part on the discontinuous reception configuration; and determining the power adjustment to the maximum transmit power limit for the first component carrier for the first subframe based at least in part on the setting the second transmit power to zero for the first subframe.

Aspect 6: The method of any of aspects 1 through 5, wherein the first component carrier is a primary component carrier configured by the base station, and the second component carrier is a secondary component carrier configured by the base station.

Aspect 7: The method of any of aspects 1 through 6, wherein the first component carrier is configured for a first RAT, and the second component carrier is configured for a second RAT.

Aspect 8: The method of aspect 7, wherein the first RAT and the second RAT are accessed using different subscriber identity modules (SIMs) of the UE.

Aspect 9: The method of any of aspects 1 through 8, wherein the power adjustment is based at least in part on a power class of the UE.

Aspect 10: A method for wireless communication at a UE, comprising: determining whether the UE is configured for uplink communications using uplink carrier aggregation of a plurality of uplink component carriers; adjusting a maximum uplink transmit power of each component carrier of the plurality of uplink component carriers based at least in part on determining that the UE is configured for uplink communications using uplink carrier aggregation; and transmitting uplink communications to a base station using at least a first component carrier of the plurality of uplink component carriers using an uplink transmit power that is at or below the adjusted maximum uplink transmit power of the first component carrier.

Aspect 11: The method of aspect 10, wherein the adjusting the maximum uplink transmit power comprises: reducing a maximum transmit power limit of each of the plurality of uplink component carriers by a maximum transmit power adjustment value of the UE.

Aspect 12: The method of aspect 11, wherein the maximum transmit power limit and the maximum transmit power adjustment value are hardware-based parameters of the UE.

Aspect 13: The method of any of aspects 10 through 12, wherein the adjusting the maximum uplink transmit power of the first component carrier allows the UE to allocate transmit power to a second component carrier when the base station requests a maximum available transmit power for an uplink transmission of the first component carrier, and a combined transmit power of the first component carrier and the second component carrier remains at or below a combined maximum transmit power limit of the UE.

Aspect 14: The method of any of aspects 10 through 13, further comprising: determining that the UE is reconfigured to remove an uplink carrier aggregation configuration and that uplink communications are to use a single component carrier; and discontinuing adjustment of the maximum uplink transmit power.

Aspect 15: The method of any of aspects 10 through 14, wherein the adjusting a maximum uplink transmit power of each of the plurality of uplink component carriers comprises: applying a static hardware-based power adjustment to a maximum transmit power limit of each component carriers of the plurality of uplink component carriers.

Aspect 16: The method of any of aspects 10 through 15, wherein the first component carrier is a primary component carrier configured by the base station, and a second component carrier of the plurality of uplink component carriers is a secondary component carrier configured by the base station.

Aspect 17: The method of any of aspects 10 through 16, wherein the first component carrier is configured for a first RAT, and a second component carrier of the plurality of uplink component carriers is configured for a second RAT.

Aspect 18: The method of aspect 17, wherein the first RAT and the second RAT are accessed using different subscriber identity modules (SIMs) of the UE.

Aspect 19: The method of any of aspects 10 through 18, wherein the adjusting the maximum uplink transmit power is further based at least in part on a power class of the UE.

Aspect 20: An apparatus for wireless communication at a UE, comprising a processor; memory coupled with the processor; and instructions stored in the memory and executable by the processor to cause the apparatus to perform a method of any of aspects 1 through 9.

Aspect 21: An apparatus for wireless communication at a UE, comprising at least one means for performing a method of any of aspects 1 through 9.

Aspect 22: A non-transitory computer-readable medium storing code for wireless communication at a UE, the code comprising instructions executable by a processor to perform a method of any of aspects 1 through 9.

Aspect 23: An apparatus for wireless communication at a UE, comprising a processor; memory coupled with the processor; and instructions stored in the memory and executable by the processor to cause the apparatus to perform a method of any of aspects 10 through 19.

Aspect 24: An apparatus for wireless communication at a UE, comprising at least one means for performing a method of any of aspects 10 through 19.

Aspect 25: A non-transitory computer-readable medium storing code for wireless communication at a UE, the code comprising instructions executable by a processor to perform a method of any of aspects 10 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving scheduling information for a plurality of subframes;
   determining, based at least in part on the scheduling information, one or more scheduling parameters for each of a plurality of component carriers used for uplink communications and a plurality of requested transmit powers associated with the plurality of component carriers;

calculating, at the UE for each subframe of the plurality of subframes based at least in part on the one or more scheduling parameters for each component carrier of the plurality of component carriers and the plurality of requested transmit powers associated with the plurality of component carriers, a power adjustment to a maximum transmit power limit for each of the plurality of component carriers, wherein:

a first power adjustment to the maximum transmit power limit for a first component carrier of the plurality of component carriers for a first subframe of the plurality of subframes is determined based at least in part on a second scheduling parameter and a second requested transmit power for a second component carrier for the first subframe, a second power adjustment to the maximum transmit power limit for the second component carrier of the plurality of component carriers for the first subframe is based at least in part on a first scheduling parameter and a first requested transmit power for the first component carrier for the first subframe, and a third power adjustment to the maximum transmit power limit for the first component carrier for a second subframe of the plurality of subframes is different than the first power adjustment to the maximum transmit power limit for the first component carrier; and transmitting uplink communications in each subframe using one or more of the plurality of component carriers with a transmit power for each component carrier that is based at least in part on the calculated first power adjustment, second power adjustment, or third power adjustment.

2. The method of claim 1, wherein the calculated power adjustments are each based at least in part on scheduling information for the plurality of subframes indicating whether data is to be transferred using each component carrier of the plurality of component carriers for each subframe.

3. The method of claim 1, wherein the calculated power adjustments are each further based at least in part on a maximum allowed value of the power adjustment.

4. The method of claim 1, further comprising:
determining that the first requested transmit power is a maximum available UE transmit power, and wherein the second power adjustment provides power for the second component carrier and maintains a combined transmit power of the UE at or below a combined maximum transmit power limit of the UE.

5. The method of claim 1, wherein the calculating further comprises:
determining, based at least in part on a discontinuous reception configuration of the second component carrier, that the second component carrier is unscheduled for uplink communications in the first subframe;
setting a second transmit power to zero for the first subframe based at least in part on the discontinuous reception configuration; and
determining the first power adjustment to the maximum transmit power limit for the first component carrier for the first subframe based at least in part on the setting the second transmit power to zero for the first subframe.

6. The method of claim 1, wherein the first component carrier is a primary component carrier configured by an access network entity, and the second component carrier is a secondary component carrier configured by the access network entity.

7. The method of claim 1, wherein the first component carrier is configured for a first radio access technology (RAT), and the second component carrier is configured for a second RAT.

8. The method of claim 7, wherein the first RAT and the second RAT are accessed using different subscriber identity modules (SIMs) of the UE.

9. The method of claim 1, wherein the calculated power adjustments are based at least in part on a power class of the UE.

10. An apparatus for wireless communication at a user equipment (UE), comprising:
a processor,
memory coupled with the processor; and
instructions stored in the memory and executable by the processor to cause the apparatus to:
receive scheduling information for a plurality of subframes;
determine, based at least in part on the scheduling information, one or more scheduling parameters for each of a plurality of component carriers used for uplink communications and a plurality of requested transmit powers associated with the plurality of component carriers;
calculate, at the UE for each subframe of the plurality of subframes based at least in part on the one or more scheduling parameters for each component carrier of the plurality of component carriers and the plurality of requested transmit powers associated with the plurality of component carriers, a power adjustment to a maximum transmit power limit for each of the plurality of component carriers, wherein:

a first power adjustment to the maximum transmit power limit for a first component carrier of the plurality of component carriers for a first subframe of the plurality of subframes is determined based at least in part on a second scheduling parameter and a second requested transmit power for a second component carrier for the first subframe, a second power adjustment to the maximum transmit power limit for the second component carrier of the plurality of component carriers for the first subframe is based at least in part on a first scheduling parameter and a first requested transmit power for the first component carrier for the first subframe, and a third power adjustment to the maximum transmit power limit for the first component carrier for a second subframe of the plurality of subframes is different than the first power adjustment to the maximum transmit power limit for the first component carrier; and transmit uplink communications in each subframe using one or more of the plurality of component carriers with a transmit power for each component carrier that is based at least in part on the calculated first power adjustment, second power adjustment, or third power adjustment.

11. The apparatus of claim 10, wherein the calculated power adjustments are each based at least in part on scheduling information for the plurality of subframes indicating whether data is to be transferred using each component carrier of the plurality of component carriers for each subframe.

12. The apparatus of claim 10, wherein the calculated power adjustments are each further based at least in part on a maximum allowed value of the power adjustment.

13. The apparatus of claim 10, wherein the instructions are further executable by the processor to cause the apparatus to:
determine that the first requested transmit power is a maximum available UE transmit power, and wherein the second power adjustment provides power for the second component carrier and maintains a combined transmit power of the UE at or below a combined maximum transmit power limit of the UE.

14. The apparatus of claim 10, wherein the instructions are further executable by the processor to cause the apparatus to:
determine, based at least in part on a discontinuous reception configuration of the second component carrier, that the second component carrier is unscheduled for uplink communications in the first subframe;
set a second transmit power to zero for the first subframe based at least in part on the discontinuous reception configuration; and
determine the first power adjustment to the maximum transmit power limit for the first component carrier for the first subframe based at least in part on the setting the second transmit power to zero for the first subframe.

15. The apparatus of claim 10, wherein the first component carrier is a primary component carrier configured by an access network entity, and the second component carrier is a secondary component carrier configured by the access network entity.

16. The apparatus of claim 10, wherein the first component carrier is configured for a first radio access technology (RAT), and the second component carrier is configured for a second RAT.

17. The apparatus of claim 16, wherein the first RAT and the second RAT are accessed using different subscriber identity modules (SIMs) of the UE.

18. The apparatus of claim 10, wherein the calculated power adjustments are based at least in part on a power class of the UE.

19. An apparatus for wireless communication at a user equipment (UE), comprising:
means for receiving scheduling information for a plurality of subframes;
means for determining, based at least in part on the scheduling information, one or more scheduling parameters for each of a plurality of component carriers used for uplink communications and a plurality of requested transmit powers associated with the plurality of component carriers;
means for calculating, at the UE for each subframe of the plurality of subframes based at least in part on the one or more scheduling parameters for each component carrier of the plurality of component carriers and the plurality of requested transmit powers associated with the plurality of component carriers, a power adjustment to a maximum transmit power limit for each of the plurality of component carriers, wherein:
a first power adjustment to the maximum transmit power limit for a first component carrier of the plurality of component carriers for a first subframe of the plurality of subframes is determined based at least in part on a second scheduling parameter and a second requested transmit power for a second component carrier for the first subframe,
a second power adjustment to the maximum transmit power limit for the second component carrier of the plurality of component carriers for the first subframe is based at least in part on a first scheduling parameter and a first requested transmit power for the first component carrier for the first subframe, and
a third power adjustment to the maximum transmit power limit for the first component carrier for a second subframe of the plurality of subframes is different than the first power adjustment to the maximum transmit power limit for the first component carrier; and
means for transmitting uplink communications in each subframe using one or more of the plurality of component carriers with a transmit power for each component carrier that is based at least in part on the calculated first power adjustment, second power adjustment, or third power adjustment.

20. The apparatus of claim 19, wherein the calculated power adjustments are each based at least in part on scheduling information for the plurality of subframes indicating whether data is to be transferred using each component carrier of the plurality of component carriers for each subframe.

21. The apparatus of claim 19, wherein the calculated power adjustments are each further based at least in part on a maximum allowed value of the power adjustment.

22. The apparatus of claim 19, further comprising:
means for determining that the first requested transmit power is a maximum available UE transmit power, and wherein the second power adjustment provides power for the second component carrier and maintains a combined transmit power of the UE at or below a combined maximum transmit power limit of the UE.

23. The apparatus of claim 19, wherein the means for the calculating further comprise:
means for determining, based at least in part on a discontinuous reception configuration of the second component carrier, that the second component carrier is unscheduled for uplink communications in the first subframe;
means for setting a second transmit power to zero for the first subframe based at least in part on the discontinuous reception configuration; and
means for determining the first power adjustment to the maximum transmit power limit for the first component carrier for the first subframe based at least in part on the setting the second transmit power to zero for the first subframe.

24. The apparatus of claim 19, wherein the first component carrier is a primary component carrier configured by an access network entity, and the second component carrier is a secondary component carrier configured by the access network entity.

25. The apparatus of claim 19, wherein the first component carrier is configured for a first radio access technology (RAT), and the second component carrier is configured for a second RAT.

26. A non-transitory computer-readable medium storing code for wireless communication at a user equipment (UE), the code comprising instructions executable by a processor to:
receive scheduling information for a plurality of subframes;
determine, based at least in part on the scheduling information, one or more scheduling parameters for each of a plurality of component carriers used for uplink communications and a plurality of requested transmit powers associated with the plurality of component carriers;

calculate, at the UE for each subframe of the plurality of subframes based at least in part on the one or more scheduling parameters for each component carrier of the plurality of component carriers and the plurality of requested transmit powers associated with the plurality of component carriers, a power adjustment to a maximum transmit power limit for each of the plurality of component carriers, wherein:

- a first power adjustment to the maximum transmit power limit for a first component carrier of the plurality of component carriers for a first subframe of the plurality of subframes is determined based at least in part on a second scheduling parameter and a second requested transmit power for a second component carrier for the first subframe,
- a second power adjustment to the maximum transmit power limit for the second component carrier of the plurality of component carriers for the first subframe is based at least in part on a first scheduling parameter and a first requested transmit power for the first component carrier for the first subframe, and
- a third power adjustment to the maximum transmit power limit for the first component carrier for a second subframe of the plurality of subframes is different than the first power adjustment to the maximum transmit power limit for the first component carrier; and transmit uplink communications in each subframe using one or more of the plurality of component carriers with a transmit power for each component carrier that is based at least in part on the calculated first power adjustment, second power adjustment, or third power adjustment.

27. The non-transitory computer-readable medium of claim 26, wherein the calculated power adjustments are each based at least in part on scheduling information for the plurality of subframes indicating whether data is to be transferred using each component carrier of the plurality of component carriers for each subframe.

28. The non-transitory computer-readable medium of claim 26, wherein the calculated power adjustments are each further based at least in part on a maximum allowed value of the power adjustment.

29. The non-transitory computer-readable medium of claim 26, wherein the instructions are further executable by the processor to:

determine that the first requested transmit power is a maximum available UE transmit power, and wherein the second power adjustment provides power for the second component carrier and maintains a combined transmit power of the UE at or below a combined maximum transmit power limit of the UE.

30. The non-transitory computer-readable medium of claim 26, wherein the instructions to calculate are further executable by the processor to:

determine, based at least in part on a discontinuous reception configuration of the second component carrier, that the second component carrier is unscheduled for uplink communications in the first subframe;

set a second transmit power to zero for the first subframe based at least in part on the discontinuous reception configuration; and determine the first power adjustment to the maximum transmit power limit for the first component carrier for the first subframe based at least in part on the setting the second transmit power to zero for the first subframe.

* * * * *